(12) United States Patent
Honda

(10) Patent No.: US 9,804,574 B2
(45) Date of Patent: Oct. 31, 2017

(54) ELECTRONIC TIMEPIECE AND CONTROL METHOD OF ELECTRONIC TIMEPIECE

(71) Applicant: Seiko Epson Corporation, Tokyo (JP)

(72) Inventor: Katsuyuki Honda, Miyada-mura (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/214,858

(22) Filed: Jul. 20, 2016

(65) Prior Publication Data

US 2017/0038742 A1 Feb. 9, 2017

(30) Foreign Application Priority Data

Aug. 7, 2015 (JP) ................................. 2015-157420

(51) Int. Cl.
*G04R 20/02* (2013.01)
*G01S 19/34* (2010.01)

(52) U.S. Cl.
CPC .............. *G04R 20/02* (2013.01); *G01S 19/34* (2013.01)

(58) Field of Classification Search
CPC .......... G04R 20/20; G04R 20/04; G01S 19/34
See application file for complete search history.

(56) References Cited

U.S. PATENT DOCUMENTS

| 2009/0180356 | A1  | 7/2009  | Fujisawa  |            |
|--------------|-----|---------|-----------|------------|
| 2009/0315763 | A1* | 12/2009 | Matsuzaki | G04R 20/04 |
|              |     |         |           | 342/357.52 |
| 2016/0127060 | A1* | 5/2016  | Cross     | H04B 7/18508 |
|              |     |         |           | 375/211    |
| 2017/0109766 | A1* | 4/2017  | Percy     | G06Q 30/0205 |

FOREIGN PATENT DOCUMENTS

JP 2009-168620 A 7/2009
JP 2012-207939 A 10/2012

* cited by examiner

*Primary Examiner* — Vit W Miska
(74) *Attorney, Agent, or Firm* — Harness, Dickey & Pierce, P.L.C.

(57) ABSTRACT

An electronic timepiece and control method of an electronic timepiece prevent system shutdowns due to a voltage drop, and increase opportunities to acquire time information. An electronic timepiece 1 has a reception module 50 that receives satellite signals; a storage battery 24 that supplies drive power; a voltage detection circuit 74 that detects the voltage of the storage battery 24; a temperature detector 67 that detects temperature; a reception command unit that instructs receiving satellite signals; and a reception controller that executes a reception process to receive satellite signals in response to a command from the reception command unit. The reception controller executes the reception process when the detected battery voltage is greater than or equal to a threshold set for the detected temperature, and does not execute the reception process when the reserve power is less than the threshold.

8 Claims, 16 Drawing Sheets

ELECTRONIC TIMEPIECE AND CONTROL METHOD OF ELECTRONIC TIMEPIECE

BACKGROUND

1. Technical Field

The present invention relates to an electronic timepiece that adjusts the time based on signals from positioning information satellites such as GPS satellites, and to a control method of an electronic timepiece.

2. Related Art

Electronic timepieces that receive signals transmitted from positioning information satellites such as GPS (Global Positioning System) satellites, and execute the reception process when the power supply voltage exceeds a specific voltage are known from the literature. See for example, JP-A-2009-168620.

When running the positioning process to receive satellite signals from multiple positioning information satellites, this electronic timepiece first determines if the supply voltage exceeds a specific voltage, and then determines if a reception process that takes one to three minutes can be executed. If the supply voltage exceeds the specific voltage, the electronic timepiece receives satellite signals from multiple positioning information satellites, and executes a positioning process that calculates time information and positioning information based on the received satellite signals. If the supply voltage is less than or equal to the specific voltage, the electronic timepiece ends the reception process.

Because this specific voltage is a previously set value, problems can happen when the reception process is controlled by comparing the specific voltage and the supply voltage.

For example, when a battery is used as the power supply and the temperature drops, the internal resistance of the power supply rises and the voltage drop that results from running the reception process to receive satellite signals increases. The specific voltage must therefore be set appropriately to the lowest limit (such as −10° C.) of the temperature range in which the electronic timepiece is expected to be used. This enables preventing the control chip from shutting down due to a drop in the supply voltage during the reception process when the positioning reception process executes in a low temperature environment near the lowest limit of the temperature range.

However, even though the specific voltage can be set to a lower voltage at temperatures above this low temperature range because the voltage drop from the reception process is lower than in the low temperature range, the specific voltage is still set to a level at which a system shutdown can be prevented even in the low temperature range. As a result, the reception process cannot be executed if the supply voltage is lower than the specific voltage even if the supply voltage is at a level at which the reception process could actually be executed at the current temperature.

Opportunities to acquire time information and adjust the internal time are therefore fewer, and the correct time may not be displayed.

SUMMARY

An electronic timepiece and a control method of an electronic timepiece according to the invention can prevent system shutdowns due to a voltage drop and increase opportunities to acquire time information as described below.

An electronic timepiece according to one aspect has a receiver configured to receive satellite signals; a power supply that supplies drive power; a remaining battery capacity detector configured to detect the reserve power of the power supply; a temperature detector that detects temperature; a reception command unit configured to command receiving satellite signals; and a reception controller configured to execute a reception process that receives satellite signals in response to a command from the reception command unit. The reception controller executes the reception process when the reserve power detected by the remaining battery capacity detector is greater than or equal to a threshold set for the temperature detected by the temperature detector, and does not execute the reception process when the reserve power is less than the threshold.

Examples of reception processes include a time reception process that receives satellite signals from positioning information satellites to get time information, and a positioning reception process that receives satellite signals from positioning information satellites to calculate positioning information.

The threshold is a threshold set so that the battery voltage will not go below the minimum operating voltage of the control chip of an electronic timepiece, and the threshold is set according to the temperature because the internal resistance of the battery changes and the voltage drop changes with temperature.

In the electronic timepiece in this example, the reception controller executes the reception process when the reserve power detected by the remaining battery capacity detector is greater than or equal to a threshold set for the temperature detected by the temperature detector, and does not execute the reception process when the reserve power is less than the threshold. In other words, the reception controller determines whether or not to execute the reception process based on the threshold set for the temperature.

Because the threshold for allowing the reception process is set based on temperature considering the increased voltage drop in the reception process when the temperature drops, system shutdowns can be reliably prevented even when the temperature changes.

Furthermore, because the threshold can be set lower at higher temperatures than low temperatures, more reception opportunities can be created than when a specific threshold is set to prevent system shutdowns only at the low range of the anticipated operating temperature range.

Preferably in the electronic timepiece described above, the reception controller executes a timekeeping reception process to acquire time information based on the satellite signals, and a positioning reception process to calculate positioning information based on the satellite signals, based on a command of the reception command unit; executes the positioning reception process if the reserve power detected by the remaining battery capacity detector is greater than or equal to a first threshold set for the positioning reception process based on the temperature detected by the temperature detector, and does not execute the positioning reception process if less than the first threshold, when the positioning reception process is commanded by the reception command unit; and executes the timekeeping reception process if the reserve power is greater than or equal to a second threshold set for the timekeeping reception process based on the temperature, and does not execute the timekeeping reception process if less than the second threshold, when the timekeeping reception process is commanded by the reception command unit; and the first threshold is higher than the second threshold.

The reception controller in this example executes the positioning reception process or the timekeeping reception process in response to a command from the reception command unit. When the positioning reception process is commanded, the reception controller executes the positioning reception process if the reserve power is greater than or equal to a first threshold, and does not execute the positioning reception process if less than the first threshold. When the timekeeping reception process is commanded, the reception controller executes the timekeeping reception process if the reserve power is greater than or equal to a second threshold, and does not execute the timekeeping reception process if less than the second threshold.

As a result, a system shutdown caused by the positioning reception process, which consumes more power than the timekeeping reception process, executing when the reserve power is lower than the first threshold can be prevented. A system shutdown caused by the timekeeping reception process executing when the reserve power is lower than the second threshold can also be prevented.

By setting a second threshold, the timekeeping reception process can execute even when the reserve power is less than the first threshold and greater than or equal to the second threshold and the positioning reception process is not allowed. As a result, more opportunities to execute the timekeeping reception process can be created than when only a first threshold for the positioning reception process, which consumes more power than the timekeeping reception process, is set to prevent system shutdowns.

An electronic timepiece according to another aspect preferably also has a reception state display unit configured to indicate reception is in progress while the reception process is running, and indicate reception is prohibited when the reception process is not allowed.

Thus comprised, whether the reception process is running or whether the reception process is not allowed can be easily known by reading the state information display unit. As a result, the user can be prompted to maintain a position in a location where satellite signals can be easily received while the reception process is executing, and the success rate of the reception process can be improved. Furthermore, because the reception process is not executed when the supply voltage is low, the user can be informed that the reception process must be executed again after recharging.

An electronic timepiece according to another aspect also has a storage storing temperature-threshold information relating temperatures and thresholds. The reception controller acquires a threshold corresponding to the temperature based on the temperature detected by the temperature detector and the threshold temperature information, compares the reserve power and the threshold, and controls reception.

In this example, the storage stores temperature-threshold information relating temperatures and thresholds, and the reception controller acquires a threshold corresponding to the temperature based on the temperature detected by the temperature detector and the stored threshold temperature information.

By referencing threshold temperature information previously stored in a storage, the threshold corresponding to the temperature can be easily acquired. Whether or not to allow the reception process can be determined more accurately even when the voltage characteristics of the power supply change due to changes in the power supply or with age by updating the threshold temperature information to update to threshold temperature information corresponding to the current voltage characteristics. Updating to threshold temperature information appropriate to the voltage characteristic is also simple.

An electronic timepiece according to another aspect has a receiver configured to receive satellite signals; a power supply that supplies drive power; a remaining battery capacity detector configured to detect the reserve power of the power supply; a temperature detector that detects temperature; a state information display unit configured to indicate state information corresponding to the reserve power and the temperature; a reception controller configured to execute a reception process that receives satellite signals; and a display control unit configured to cause the state information display unit to display state information corresponding to the reserve power detected by the remaining battery capacity detector and the temperature detected by the temperature detector.

State information in this example is information indicating, for example, whether or not the reception process is allowed at the detected reserve power and temperature, remaining operating time information indicating how long the electronic timepiece can operate, or information indicating that the reserve power is low and recharging is required.

The state information display unit is configured to display state information as controlled by the display control unit. The display control unit displays state information based on the detected reserve power and temperature on the state information display unit.

This configuration can display state information about the electronic timepiece based on the reserve power and temperature. For example, if charging is required by the content of the process, the user can be so informed before executing the process, and user convenience can be improved. When the user determines that charging is required by the content of the process, opportunities for executing the process (such as a reception process) can be increased by first charging the battery.

In an electronic timepiece according to another aspect, the state information includes reception-allowed state information indicating executing the reception process is allowed, and reception-prohibited state information indicating the reception process is not allowed; and the display control unit causes the state information display unit to indicate the reception-allowed state information when the reserve power detected by the remaining battery capacity detector is greater than or equal to a threshold set for the temperature detected by the temperature detector, and causes the state information display unit to indicate the reception-prohibited state information when the reserve power is less than the threshold.

The state information display unit in this example is configured to display state information including reception-allowed state information and reception-prohibited state information as controlled by the display control unit. When the reserve power detected by the remaining battery capacity detector is greater than or equal to a threshold set for the temperature detected by the temperature detector, the display control unit causes the reception-allowed state information to be displayed, and causes the reception-prohibited state information to be displayed when less than the threshold voltage.

This configuration can set the threshold for allowing the reception process based on temperature considering the increased voltage drop from the reception process when the temperature drops. That reception is prohibited and there is a chance of a system shutdown if the reception process executes can be displayed and system shutdowns can be prevented even when the temperature changes.

Furthermore, the threshold can be set lower at higher temperatures than low temperatures, opportunities to display reception-allowed state information can be increased in a high temperature range, and more reception opportunities can therefore be created, than when the specific threshold is set to prevent system shutdowns at the low range of the anticipated operating temperature range.

The user can also check if the reception process is allowed before executing the reception process. As a result, the user can move to a location where satellite signals can be easily received and the electronic timepiece can be made to run the reception process after checking that the reception process is allowed, and user convenience can be improved.

In an electronic timepiece according to another aspect, the reception controller executes a timekeeping reception process to acquire time information based on the satellite signals, and a positioning reception process to calculate positioning information based on the satellite signals; the reception-allowed state information includes positioning-allowed state information indicating the positioning reception process is allowed, and timekeeping-allowed state information indicating the timekeeping reception process is allowed; and the display control unit displays the positioning-allowed state information when the reserve power detected by the remaining battery capacity detector is greater than or equal to a first threshold set for the positioning reception process based on the temperature detected by the temperature detector, displays the timekeeping-allowed state information when the reserve power is less than the first threshold and is greater than or equal to the second threshold set for the timekeeping reception process based on the temperature, and displays the reception-prohibited state information when the reserve power is below the second threshold.

The reception controller in this aspect is configured to execute a positioning reception process and a timekeeping reception process. The display control unit displays positioning-allowed state information when the reserve power is greater than or equal to a first threshold, displays timekeeping-allowed state information when the reserve power is less than the first threshold and greater than or equal to a second threshold, and displays reception-prohibited state information when less than the second threshold.

As a result, the user can be informed of the type of reception process that is allowed based on the detected battery voltage and temperature, and if the reception process is prohibited. The user can therefore know if charging is required for the type of reception process, can charge the battery if charging is required, and user convenience can be improved.

Furthermore, because the thresholds are set according to the type of reception process, system shutdowns resulting from the positioning reception process, which consumes more power than the timekeeping reception process, executing when the reserve power is below the first threshold can be prevented.

Furthermore, by setting the second threshold, that the timekeeping reception process is allowed can be displayed even when the reserve power is below the first threshold and greater than or equal to the second threshold and the positioning reception process is not allowed. As a result, more opportunities to execute the timekeeping reception process can be created than when only a first threshold for the positioning reception process, which consumes more power than the timekeeping reception process, is set to prevent system shutdowns.

Another aspect is a control method of an electronic timepiece having a receiver configured to receive satellite signals, a power supply that supplies drive power, a remaining battery capacity detector configured to detect the reserve power of the power supply, a temperature detector that detects temperature, a reception command unit configured to command receiving satellite signals, and a reception controller configured to execute a reception process that receives satellite signals in response to a command from the reception command unit. The control method includes a step of the temperature detector detecting the temperature; a step of the remaining battery capacity detecting the reserve power; and a step of the reception controller executing the reception process when the reserve power detected by the remaining battery capacity detector is greater than or equal to a threshold set for the temperature detected by the temperature detector, and not executing the reception process when the reserve power is less than the threshold.

This control method of an electronic timepiece has the same effect as the electronic timepiece described above.

A control method of an electronic timepiece having a receiver configured to receive satellite signals; a power supply that supplies drive power; a remaining battery capacity detector configured to detect the reserve power of the power supply; a temperature detector that detects temperature; a state information display unit configured to indicate state information corresponding to the reserve power and the temperature; a reception controller configured to execute a reception process that receives satellite signals; and a display control unit configured to cause the state information display unit to display state information corresponding to the reserve power detected by the remaining battery capacity detector and the temperature detected by the temperature detector includes a step of the temperature detector detecting the temperature; a step of the remaining battery capacity detector detecting the reserve power; and a step of the display control unit causing the state information display unit to display state information corresponding to the temperature detected by the temperature detector and the reserve power detected by the remaining battery capacity detector.

This control method of an electronic timepiece has the same effect as the electronic timepiece described above.

Other objects and attainments together with a fuller understanding of the invention will become apparent and appreciated by referring to the following description and claims taken in conjunction with the accompanying drawings.

DESCRIPTION OF EMBODIMENTS

Embodiment 1

A first embodiment is described below with reference to accompanying figures. Note that the crystal 15 side of the electronic timepiece 1 in the following embodiments is also referred to as the face, front, or top side, and the back cover 12 side is also referred to as the back or bottom side of the electronic timepiece 1.

Figure 1:
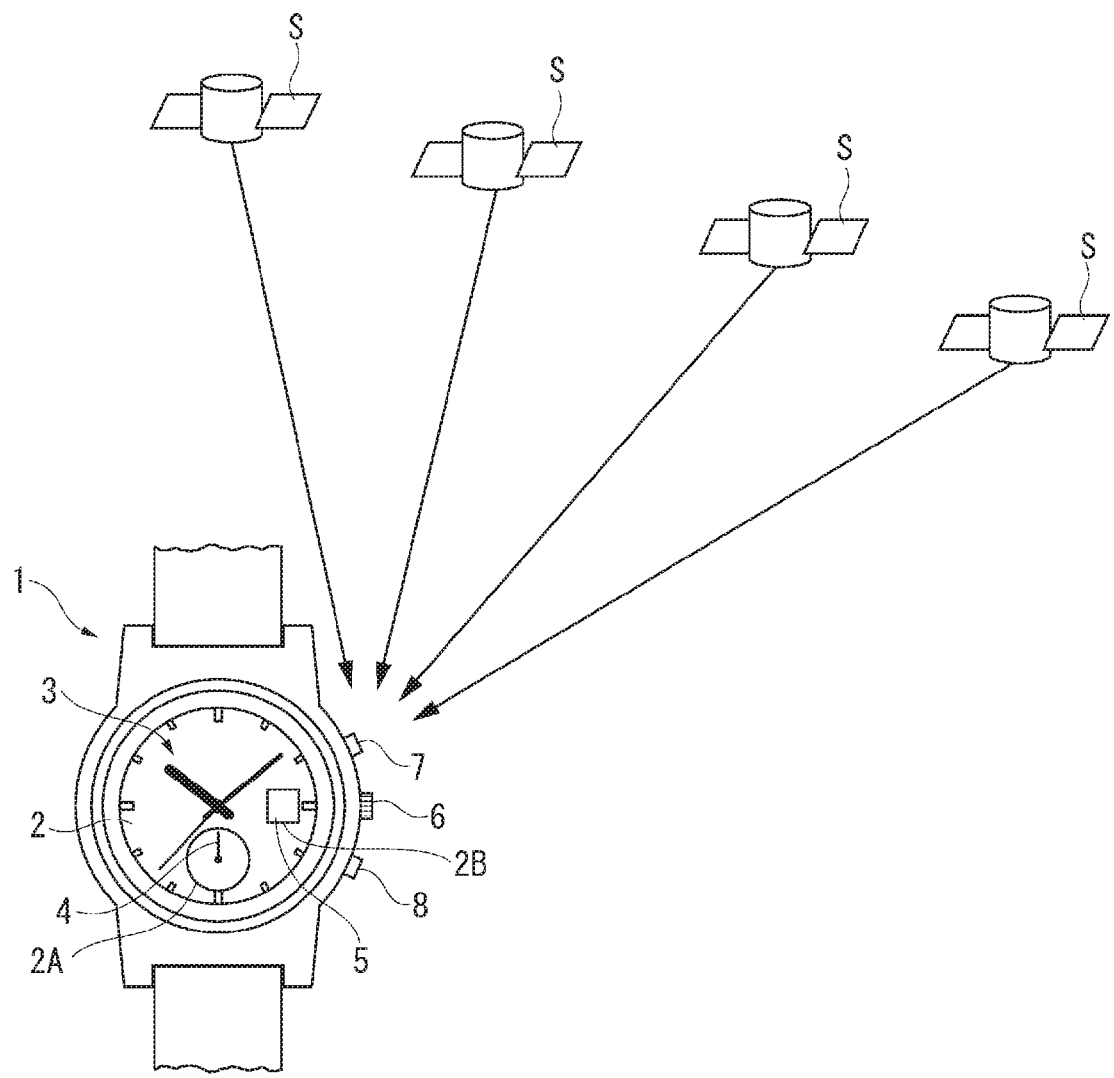
FIG. 1 illustrates an electronic timepiece according to a first embodiment.
Figure 2:
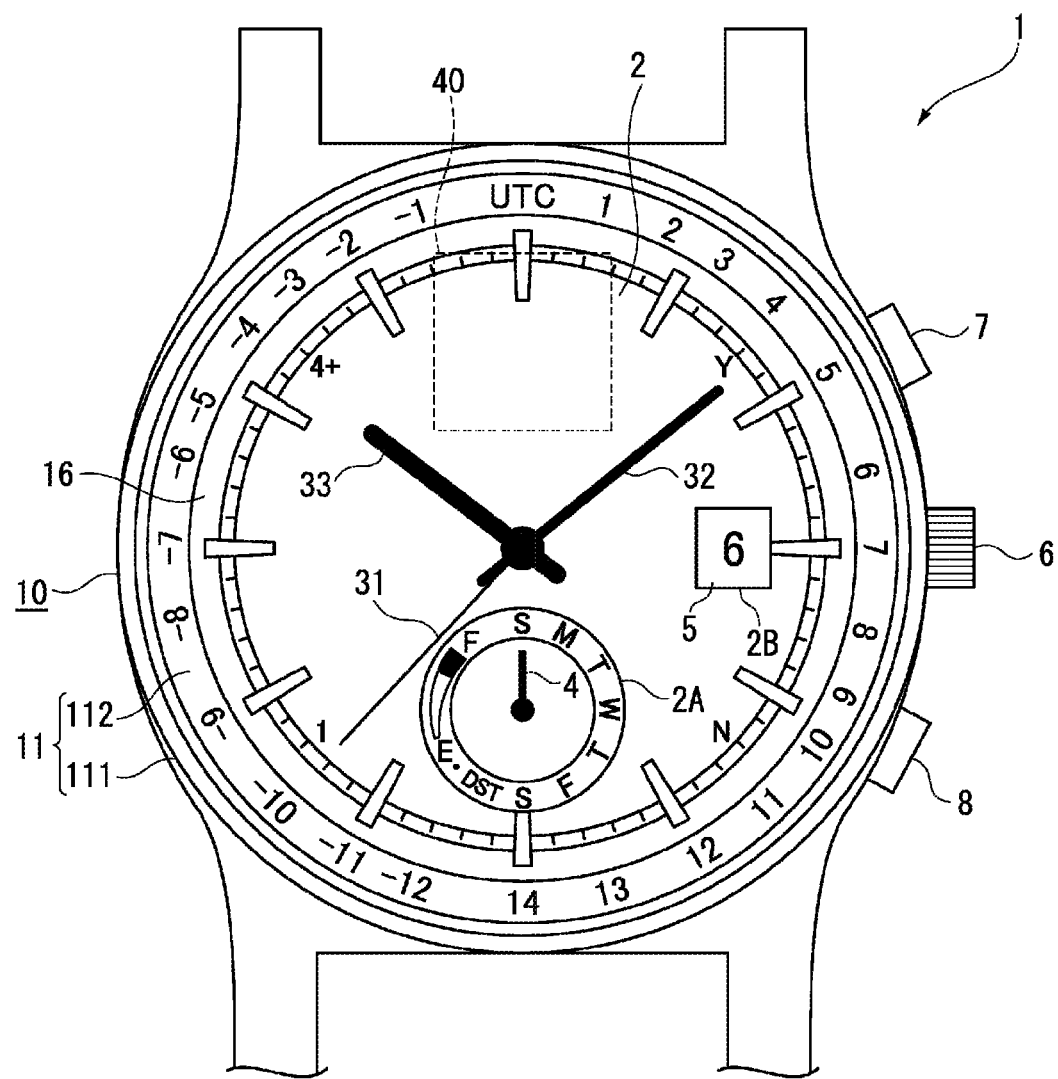
FIG. 2 is a plan view of the electronic timepiece.

As shown in FIG. 1 and FIG. 2, the electronic timepiece 1 is a wristwatch with a time display unit for displaying the time using a dial 2 and hands 3, an information display unit including a subdial 2A of the dial 2 and a hand 4, and a calendar display unit including a window 2B in the dial 2 and a date wheel 5.

The dial 2 is a disc-shaped member made of polycarbonate or other non-conductive material. Markers for displaying the time are disposed to the dial 2. A "1" marker indicating that the timekeeping reception process for acquiring time information is executing is provided at the 38 second position on the dial 2, and a "4+" marker indicating that the positioning reception process for acquiring time information and positioning information is executing is provided at the 52 second position. A "Y" marker indicating that reception was successful is at the 8 second position on the dial 2, and a "N" marker indicating that reception failed or executing the timekeeping reception process or the positioning reception process is not allowed is at the 22 second position.

A subdial 2A is also provided at the 6:00 position of the dial 2. The letters S, M, T, W, T, F, S indicating the days of the week are provided on the right side of the subdial 2A. A "DST" marker indicating the summer time (daylight saving time) mode is set, and a solid dot "." marker indicating that DST is not set, are provided near 8:00 on the left side of the subdial 2A (the location of 8:00 relative to the pivot 4A of the hand 4). Also on the left side of the subdial 2A are "E" and "F" markers, and a sickle-shaped scale between these markers, for indicating the current power reserve (remaining battery capacity). An information display comprising the subdial 2A and hand (small hand) 4 can therefore be used to indicate information including the operating mode of the timepiece, the day of the week, and the reserve power.

Figure 3:
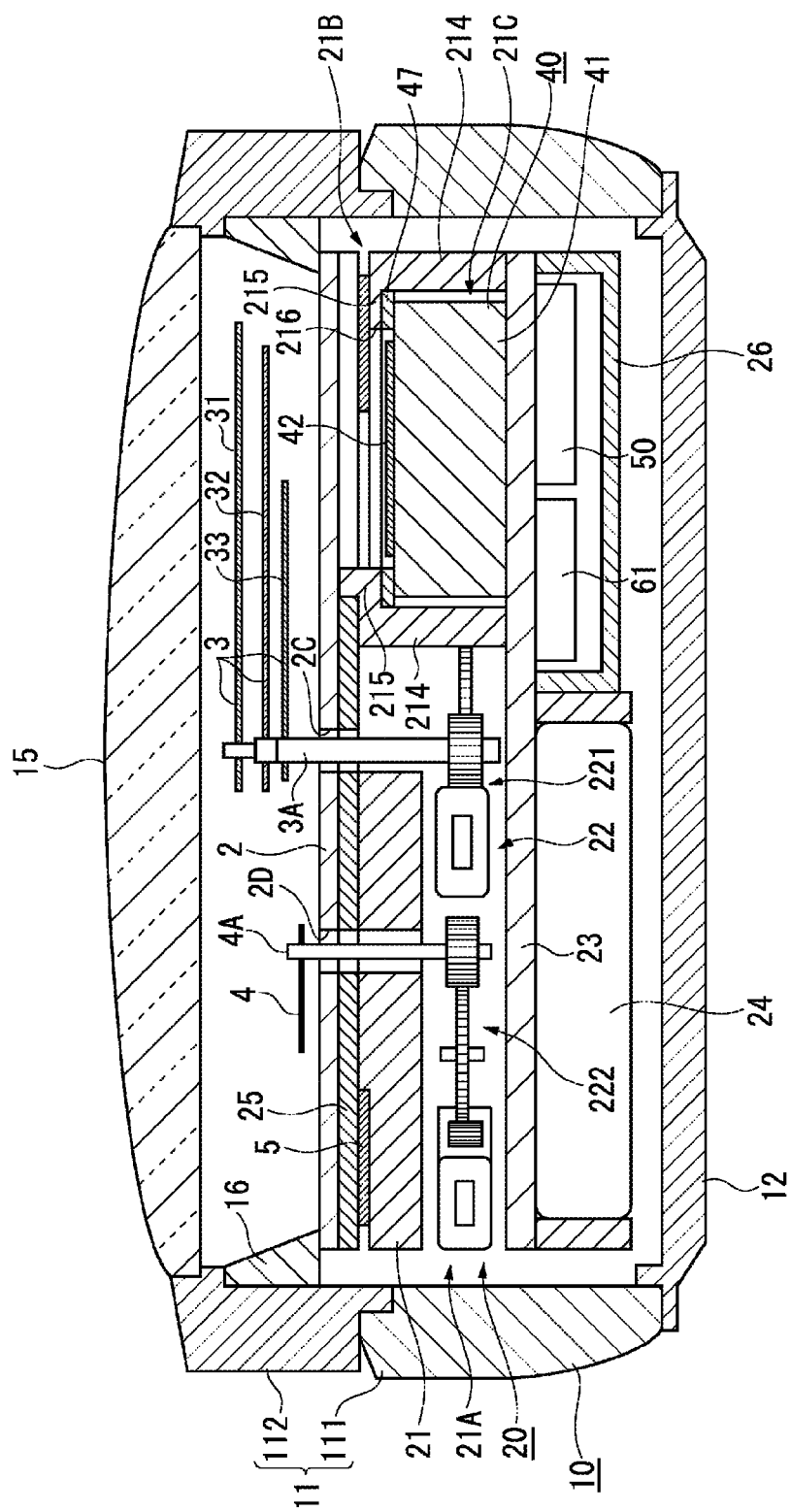
FIG. 3 is a section view of the electronic timepiece.

A calendar window 2B is located at 3:00 on the dial 2. In addition to the subdial 2A and window 2B, a through-hole 2C through which the center pivot 3A of the hands 3 passes, and a through-hole 2D through which the pivot 4A of the small hand 4 passes, are formed in the dial 2 as shown in FIG. 3.

The hands 3 include a second hand 31, minute hand 32, and hour hand 33. The hands 3, 4 and date wheel 5 are driven by a drive mechanism including stepper motors and wheel train as described further below.

The electronic timepiece 1 also has a crown 6 and buttons 7 and 8.

The electronic timepiece 1 is configured to receive satellite signals and acquire satellite time information from plural positioning information satellites, such as GPS satellites, orbiting Earth on known orbits, acquire satellite time information, and correct internal time information based on the acquired satellite time information.

Note that the GPS satellites S shown in FIG. 1 are an example of a positioning information satellite, and multiple satellites are in orbit. At present, there is a constellation of approximately 30 GPS satellites in orbit.

External Structure of the Electronic Timepiece

As shown in FIG. 2 and FIG. 3, the electronic timepiece 1 has a case 10 that houses a movement 20 described further below. The case 10 includes the main case 11 and back cover 12.

The main case 11 includes a tubular case member 111, and a bezel 112 disposed on the front side of the case member 111.

The bezel 112 is ring-shaped. The bezel 112 and case member 111 are connected by an interlocking tongue-and-groove structure formed on their mutual opposing surfaces, or by double-sided adhesive tape or adhesive, for example. The bezel 112 may also be attached so that it can rotate on the outside case member 111.

The crystal 15 is attached to the inside of the bezel 112 and is held by the bezel 112.

A round back cover 12 is disposed to the back cover side of the outside case member 111 covering the back cover side opening to the outside case member 111. The back cover 12 and the outside case member 111 screw together.

Note that the outside case member 111 and the back cover 12 are discrete members in this embodiment, but the invention is not so limited and the outside case member 111 and back cover 12 may be formed in unison as a single piece.

The outside case member 111, bezel 112, and back cover 12 are made of brass, stainless steel, titanium alloy, or other conductive metal material.

Internal Configuration of the Electronic Timepiece

The internal structure housed in the case 10 of the electronic timepiece 1 is described next.

As shown in FIG. 2 and FIG. 3, a movement 20, planar antenna 40 (patch antenna), date wheel 5, and dial ring 16 are housed in addition to the dial 2 inside the case 10.

The movement 20 includes the base plate 21, a drive module 22 supported by the base plate 21, a circuit board 23, a storage battery 24, and a solar panel 25.

The base plate 21 is made from plastic or other non-conductive material. The base plate 21 includes a drive module housing 21A that holds the drive module 22, a date wheel housing 21B where the date wheel 5 is disposed, and an antenna housing 21C that holds the planar antenna 40.

The drive module housing 21A and antenna housing 21C are disposed on the back side of the base plate 21. The antenna housing 21C has four walls 214 (only two shown in FIG. 3) facing the four sides of the planar antenna 40, and four cover parts 215 (only two shown in FIG. 3) protruding from the walls 214 and opposing the front side of the planar antenna 40. A through-hole 216 overlapping at least part of the antenna electrode 42 of the planar antenna 40 in plan view is formed between the cover parts 215. Note that the four walls 214 are formed in unison, and the four cover parts 215 are formed in unison.

Because the antenna housing 21C is at 12:00 on the dial 2 in plan view, the planar antenna 40 is also located at 12:00 as shown in FIG. 2.

The drive module 22 is held in the drive module housing 21A of the base plate 21, and drives the time display unit, information display unit, and date display unit. More specifically, the drive module 22 includes a drive mechanism 221 with a stepper motor and wheel train for driving the hands 3, a drive mechanism 222 with a stepper motor and wheel train for driving the hand 4, and a drive mechanism 223 (not shown in the figure) including a stepper motor and wheel train for driving the date wheel 5.

The top side of the circuit board 23 contacts the back side of the base plate 21, and is attached to the base plate 21 by screw or other fastener. The planar antenna 40 is mounted on the face side of the circuit board 23. A reception module 50 (wireless communication unit) that processes satellite signals received from the GPS satellites S by the planar antenna 40, and a control unit 61 that controls the drive mechanisms 221, 222, are mounted on the back side of the circuit board 23. A receiver for receiving satellite signals from GPS satellites S, which are positioning information satellites, is thus embodied by the planar antenna 40 and reception module 50.

The reception module 50 and control unit 61 are located on the opposite side of the circuit board 23 as the planar antenna 40. The reception module 50 and control unit 61 are also enclosed by a shield 26. As a result, signals received by the planar antenna 40 are protected from noise produced by the reception module 50 and control unit 61.

A lithium ion battery is used for the storage battery 24. The storage battery 24 supplies power to the drive module 22, reception module 50, and control unit 61. The storage battery 24 is also disposed to the back side of the circuit board 23 at a position not overlapping the reception module 50 and control unit 61 in plan view.

The surface electrode on the top side of the solar panel 25 is made from indium tin oxide (ITO) or other transparent electrode material that passes light. A amorphous silicon semiconductor thin film is formed as the photovoltaic layer on a plastic film base layer.

Because GPS satellite signals are high frequency signals of approximately 1.5 GHz, GPS signals are attenuated by even the thin transparent electrode of the solar panel, unlike the long wave standard time signals that are received by radio-controlled timepieces, and antenna performance drops. As a result, a notch is formed in the disc-shaped solar panel 25 at the position overlapping the planar antenna 40 in plan view. The solar panel 25 therefore covers the face side of the base plate 21 but does not cover the planar antenna 40. The planar antenna 40 can therefore receive radio waves through the notch in the solar panel 25.

Note that an opening superimposed in plan view with the window 2B in the dial 2, and holes through which the pivots 3A, 4A of the hands 3, 4 pass, are also formed in the solar panel 25.

The planar antenna 40, which is a patch antenna (microstrip antenna), is disposed in the antenna housing 21C. The planar antenna 40 receives satellite signals from GPS satellites S. The planar antenna 40 is described further below in detail.

The date wheel 5, which is a ring-shaped calendar wheel having date numbers displayed on the surface, is held in the date wheel housing 21B of the base plate 21. The date wheel 5 is made from plastic or other non-conductive material. In plan view, the date wheel 5 overlaps at least part of the planar antenna 40. Note that the calendar wheel is not limited to a date wheel 5, and may be a day wheel showing the days of the week, or a month wheel showing the months.

The dial 2 is disposed to the face side of the base plate 21 covering the solar panel 25 and the date wheel 5. The dial 2 is made from a material such as plastic that is non-conductive and transparent to at least some light.

Abbreviations or other markings can be disposed to the surface of the dial 2 overlapping the planar antenna 40 in plan view. To improve the reception performance of the planar antenna 40, these parts are preferably made from plastic or other non-conductive material instead of metal.

Because the dial 2 is transparent, the solar panel 25 located on the back side of the dial 2 can be seen through the dial 2 from the front of the timepiece. The color of the dial 2 appears different in the areas where the solar panel 25 is present and where the solar panel 25 is not present. Design accents may be added to the dial 2 so that this color different is not conspicuous.

By forming this notch in the solar panel 25, the color tone of the dial 2 in the part overlapping the notch appears different from the tone in other parts of the dial 2. To prevent this, a plastic sheet of the same color (such as dark blue or purple) as the solar panel 25 may be disposed below the solar panel 25, or the signal-blocking electrode layer may be removed only in the part overlapping the planar antenna 40 in plan view instead of cutting completely through the solar panel 25 so that the plastic film base layer remains and the color of the solar panel 25 is the same throughout.

A dial ring 16 that is made of a non-conductive plastic material in a ring shape is disposed to the face side of the dial 2. The dial ring 16 is disposed around the circumference of the dial 2, is conically shaped with the inside circumference surface sloping down to the dial 2, and has 60 minute markers printed on the inside sloping surface. The dial ring 16 is held pressed against the dial 2 by the bezel 112.

In plan view, the planar antenna 40 does not overlap the main case 11 (outside case member 111 and bezel 112) and solar panel 25, but does overlap the date wheel 5, dial 2, and crystal 31, which are made from non-conductive materials. More specifically, all parts of the electronic timepiece 1 that are over the face side of the planar antenna 40 in plan view are made from non-conductive materials.

As a result, satellite signals passing from the face side of the timepiece pass through the crystal 31, pass through the dial 2, date wheel 5, and base plate 21 without interference from the main case 11 or solar panel 25, and are incident to the planar antenna 40. Note that because the hands 3, 4 overlap only a small area of the planar antenna 40, there is no interference with signal reception even if the hands are metal, but the hands are preferably made from a non-conductive material because any interference with signal reception can be avoided.

Planar Antenna

GPS satellites S transmit right-hand circularly polarized satellite signals. As a result, the planar antenna 40 according to this embodiment is a patch antenna (also called a microstrip antenna) with excellent circular polarization characteristics.

The planar antenna 40 according to this embodiment is a patch antenna having a conductive antenna electrode 42 on a ceramic dielectric substrate 41.

This planar antenna 40 can be manufactured as described below. First, barium titanate with a dielectric constant of 60-100 is formed to the desired shape in a press and sintered to complete the ceramic dielectric substrate 41 of the antenna. Aground electrode forming the ground plane (GND) of the antenna is made by screen printing a primarily silver (Ag) paste, for example, on the back side (the side facing the circuit board 23) of the dielectric substrate 41.

A radiating antenna electrode 42 that determines the antenna frequency and the polarity of the received signals is formed on the face side of the dielectric substrate 41 (the side facing the base plate 21 and dial 2) by the same method as the ground electrode 43. The antenna electrode 42 is slightly smaller than the surface of the dielectric substrate 41, and an exposed surface where the antenna electrode 42 is not present is disposed around the antenna electrode 42 on the surface of the dielectric substrate 41.

A square patch antenna resonates when one side is a half wavelength, and a round patch antenna resonates when the diameter is approximately 0.58 wavelength, but the size of the antenna size can be reduced by the wavelength shortening effect of a dielectric. A patch antenna works by the strong electric field around the edge of the patch (antenna electrode 42) radiating from the edge into space, and the electric lines of force become stronger with proximity to the antenna and are easily affected by the effects of nearby metals and dielectrics. To receive GPS satellite signals, therefore, the distance between the metal outside case member 111 and the antenna electrode 42 must be at least 3 mm, and is ideally approximately 4 mm.

In this example, the walls 214 are located between the planar antenna 40 and outside case member 111, and the planar antenna 40 is disposed to a position separated at least a specific distance from the inside surface of the outside case member 111. As a result, a drop in reception performance due to the proximity of the planar antenna 40 to the metal outside case member 111 can be suppressed, and the reception performance required by the electronic timepiece 1 can be assured.

The planar antenna 40 is mounted on the circuit board 23, and is electrically connected to the GPS antenna module, which is the reception module 50 on the back side of the circuit board 23. The circuit board 23 can also function as a ground plane by connecting the ground electrode 43 of the planar antenna 40 through the ground pattern of the circuit board 23 to the ground node of the reception module 50. The outside case member 111 and back cover 12 can also be used as the ground plane by connecting the ground node of the reception module 50 through the ground pattern of the circuit board 23 to the metal outside case member 111 or back cover 12.

The planar antenna 40 is held in the antenna housing 21C by affixing the circuit board 23 to the base plate 21. Because the planar antenna 40 receives high frequency 1.54542 GHz signals, and includes a ceramic dielectric substrate 41 with a high dielectric constant, the planar antenna 40 is susceptible to the effects of surrounding parts. The base plate 21 is plastic, but has a dielectric constant of 3-4, and affects the reception frequency if the gap between the base plate 21 and the antenna electrode 42 is less than approximately 1.0 mm. More specifically, the antenna frequency may shift and reception performance drop if the gap between the base plate 21 and the antenna electrode 42 varies even slightly.

As shown in FIG. 3, a through-hole 216 is formed in the antenna housing 21C of the base plate 21 in the surface opposite the antenna electrode 42 of the planar antenna 40, that is, the surface on the dial 2 side.

The through-hole 216 in this example is formed overlapping all of the antenna electrode 42 in plan view. More specifically, because the antenna electrode 42 is substantially rectangular in plan view, the through-hole 216 is also rectangular in plan view when seen from the dial side of the electronic timepiece 1.

The length of one side of the rectangular through-hole 216 is greater than the length of one side of the antenna electrode 42 and less than the length of one side of the dielectric substrate 41. Note that the length of each of the four sides of the through-hole 216 is the same, but the through-hole 216 may be formed as a rectangle with different length and width dimensions in plan view.

By thus providing a through-hole 216 superimposed in plan view on the antenna electrode 42, the base plate 21 (dielectric) does not cover and is not closer than 1.0 mm to the antenna electrode 42, and the antenna frequency is prevented from shifting due to variation in the gap between the antenna electrode 42 and the dielectric base plate 21.

The length between the walls 214 is greater than length and is set to a dimension that accommodates the dielectric substrate 41 of the planar antenna 40. The cover parts 215 protruding from the walls 214 are formed overlapping the exposed surface of the dielectric substrate 41 in plan view.

A sponge or other type of shock absorber 47 is also disposed between the exposed surface and the cover parts 215. The position of the planar antenna 40 in the thickness direction of the timepiece is set by holding the dielectric substrate 41 against the shock absorber 47.

The ceramic dielectric substrate 41 is also hard and easily chipped, but contact between the dielectric substrate 41 and the base plate 21 can be prevented by the intervening shock absorber 47. Damage to the dielectric substrate 41 by collision with the base plate 21 can therefore also be prevented.

Part of the date wheel 5 is also disposed on the dial 2 side of the planar antenna 40. Because the antenna electrode 42 and date wheel 5 are separated by at least the thickness of the cover parts 215, the date wheel 5 does not cause the antenna frequency to shift.

Circuit Configuration of the Electronic Timepiece

The circuit design of the electronic timepiece 1 is described next with reference to FIG. 4.

Figure 4:
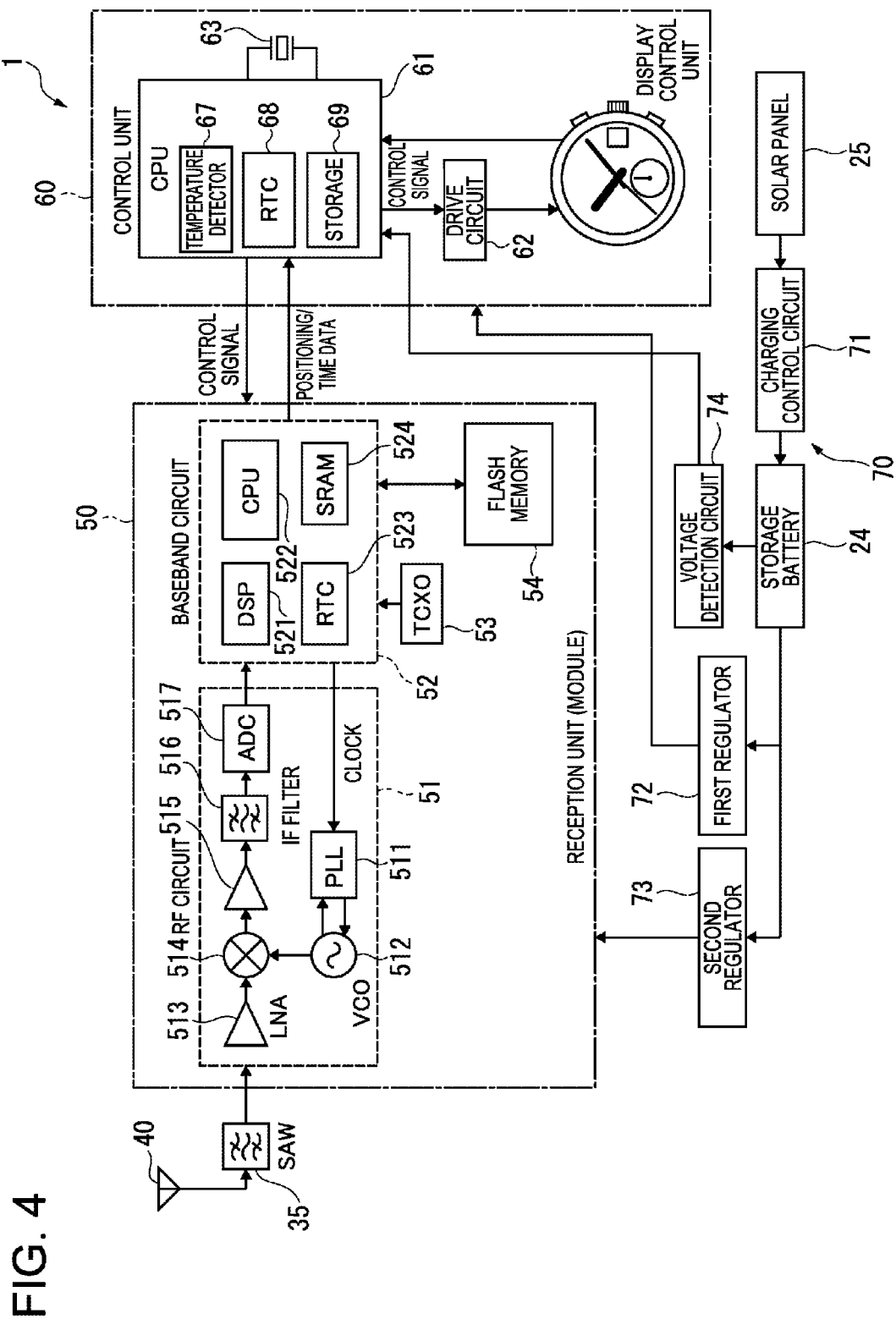
FIG. 4 is a block diagram showing the circuit configuration of the electronic timepiece.

As shown in FIG. 4, the electronic timepiece 1 has a planar antenna 40, a SAW filter 35, the reception module 50, a display control unit 60, and a power supply unit 70.

The SAW filter 35 is a bandpass filter that passes signals in the 1.5 GHz waveband. A LNA (low noise amplifier) may also be disposed between the planar antenna 40 and the SAW filter 35 to improve reception sensitivity.

Note also that the SAW filter 35 may be embedded in the reception module 50.

The reception module 50 processes satellite signals passed through the SAW filter 35, and includes an RF (radio frequency) circuit 51 and a baseband circuit 52.

The RF circuit 51 includes a PLL (phase-locked loop) circuit 511, a VCO (voltage controlled oscillator) 512, a LNA (low noise amplifier) 513, a mixer 514, an IF (intermediate frequency) amplifier 515, an IF filter 516, and an A/D converter 517.

The satellite signal passed by the SAW filter 35 is amplified by the LNA 513, mixed by the mixer 514 with the clock signal output by the VCO 512, and down-converted to a signal in the intermediate frequency band.

The IF signal from the mixer 514 is amplified by the IF amplifier 515, passed through the IF filter 516, and converted to a digital signal by the A/D converter 517.

The baseband circuit 52 includes, for example, a DSP (digital signal processor) 521, CPU (central processing unit) 522, a RTC (real-time clock) 523, and SRAM (static random access memory) 524. A TCXO (temperature compensated crystal oscillator) 53 and flash memory 54 are also connected to the baseband circuit 52.

A digital signal is input from the A/D converter 517 of the RF circuit 51 to the baseband circuit 52, which acquires satellite time information and navigation information by a correlation process and positioning computation process.

Note that the clock signal for the PLL circuit 511 is generated by the TCXO 53.

A time difference database relationally storing location information (latitude and longitude data) and time difference data is stored in flash memory 54. Note that an EEPROM (Electrically Erasable Programmable Read-Only Memory) device may be used instead of flash memory 54.

The time difference database is stored in flash memory 54 in the reception module 50 in this embodiment, but nonvolatile memory such as EEPROM or flash memory may be provided in the control unit 61 of the display control unit 60 and the time difference database stored in this nonvolatile memory.

The display control unit 60 includes a control unit (CPU) 61, a drive circuit 62 that drives the hands 3, 4, a crystal oscillator 63, a time display unit, and an information display unit.

The control unit 61 includes a temperature detector 67, RTC 68, and storage 69.

The temperature detector 67 detects the temperature around the control unit 61 located inside the case 10. By using this temperature detector 67, the temperature of the power supply unit 70 can be detected more accurately than if the temperature detector 67 is on the outside of the case 10.

The RTC 68 calculates the internal time information using a reference signal output from the crystal oscillator 63.

The storage 69 stores the satellite time information and positioning information output from the reception module 50.

By having the reception module 50 and display control unit 60 described above, the electronic timepiece 1 in this example can automatically correct the displayed time based on the satellite signals received from the GPS satellites S.

The power supply unit 70 includes the solar panel 25, a charging control circuit 71, the storage battery 24, a first regulator 72, a second regulator 73, and a voltage detection circuit 74.

When light is incident and the solar panel 25 produces power, the power obtained by photovoltaic generation is passed by the charging control circuit 71 to the storage battery 24 to charge the storage battery 24.

The storage battery 24 embodies the power supply, and supplies drive power through the first regulator 72 to the display control unit 60, and supplies power through the second regulator 73 to the reception module 50.

The voltage detection circuit 74 monitors the output voltage of the storage battery 24 at a regular interval (such as every 5-10 seconds), and outputs to the control unit 61. A power reserve detector that detects the reserve power in the storage battery 24 is thus embodied by the voltage detection circuit 74. Because the battery voltage detected by the voltage detection circuit 74 is input to the control unit 61, the control unit 61 can know the storage battery 24 voltage and control the reception process.

Controller Configuration

Figure 5:
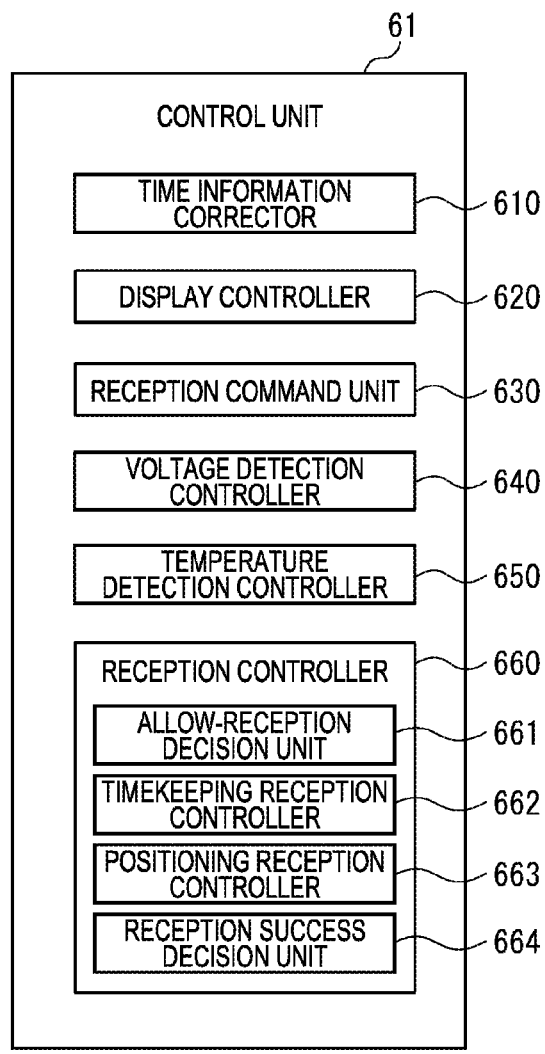
FIG. 5 is a block diagram illustrating the configuration of the control unit of the electronic timepiece.

The configuration of the control unit 61 is described next with reference to FIG. 5. FIG. 5 illustrates function blocks that are embodied by a program executed by the control unit 61.

The control unit 61 includes a time information corrector 610, display controller 620, reception command unit 630, voltage detection controller 640, temperature detection controller 650, and reception controller 660.

The time information corrector 610 corrects the internal time information using time information received by the reception module 50.

In the normal operating mode, the display controller 620 controls the drive circuit 62 based on the internal time information to display the time (hour, minute, second) with the hands 3. The display controller 620 also controls the drive circuit 62 based on the internal time information to indicate the day of the week (Sunday to Saturday) with hand 4.

The display controller 620 also controls the information indicated by the hands 3, 4 appropriately to the reception control state. The specific control method is described below.

When a specific operation is performed or a specific condition is met, the reception command unit 630 commands running a reception process.

For example, when the button 7 is pressed for a first set time (3 seconds in this example) or longer and less than a second set time (6 seconds in this example), the reception command unit 630 determines the timekeeping reception operation was performed and instructs executing the timekeeping reception process. When the button 7 is pressed for the second set time or longer, the reception command unit 630 determines a positioning reception operation was performed and instructs executing the positioning reception process.

In addition to when the above manual operations are performed, the reception command unit 630 also instructs running the timekeeping reception process when a specific condition is met. This specific condition may be, for example, when a specific time, such as a previously set automatic (scheduled) reception time is reached, or when the power output of the solar panel 25 is greater than or equal to a specific value.

The voltage detection controller 640 operates the voltage detection circuit 74 to detect the voltage, that is, the remaining battery capacity, of the storage battery 24. The voltage detection controller 640 operates the voltage detection circuit 74 and detects the battery voltage at a specific time interval.

The temperature detection controller 650 operates the temperature detector 67 and detects the temperature when a reception command is detected.

The reception controller 660 includes an allow-reception decision unit 661, a timekeeping reception controller 662, a positioning reception controller 663, and a reception success decision unit 664.

When a reception command is detected, the allow-reception decision unit 661 determines based on the detected storage battery 24 voltage whether or not to allow running a reception process. The method of determining whether or not to allow the reception process is described below.

The timekeeping reception controller 662 controls the reception module 50 to run the timekeeping reception process.

The positioning reception controller 663 controls the reception module 50 to run the positioning reception process.

The reception success decision unit 664 determines if the timekeeping reception process of the timekeeping reception controller 662 or the positioning reception process of the positioning reception controller 663 was successful. For example, the reception process is determined to not be successful if GPS satellites S cannot be locked within a specific time, or if the time information or positioning information cannot be acquired. In the timekeeping reception process, the reception success decision unit 664 compares the time information (Z count) acquired from the received satellite signals with the time data of the RTC 68. If the difference therebetween is great, the reception success decision unit 664 may compare the Z count with the Z count received in the next subframe 6 seconds later to prevent correction errors, and if multiple satellites are locked onto, the reception decision unit 646 may compare the Z counts from the plural satellites to determine if the acquired time data matches. If the reception success decision unit 664 determines the times match, the time information corrector 610 corrects the time.

Reception Process

Processing when the timekeeping reception process is executed as the reception process is described next with reference to FIG. 6.

Figure 6:
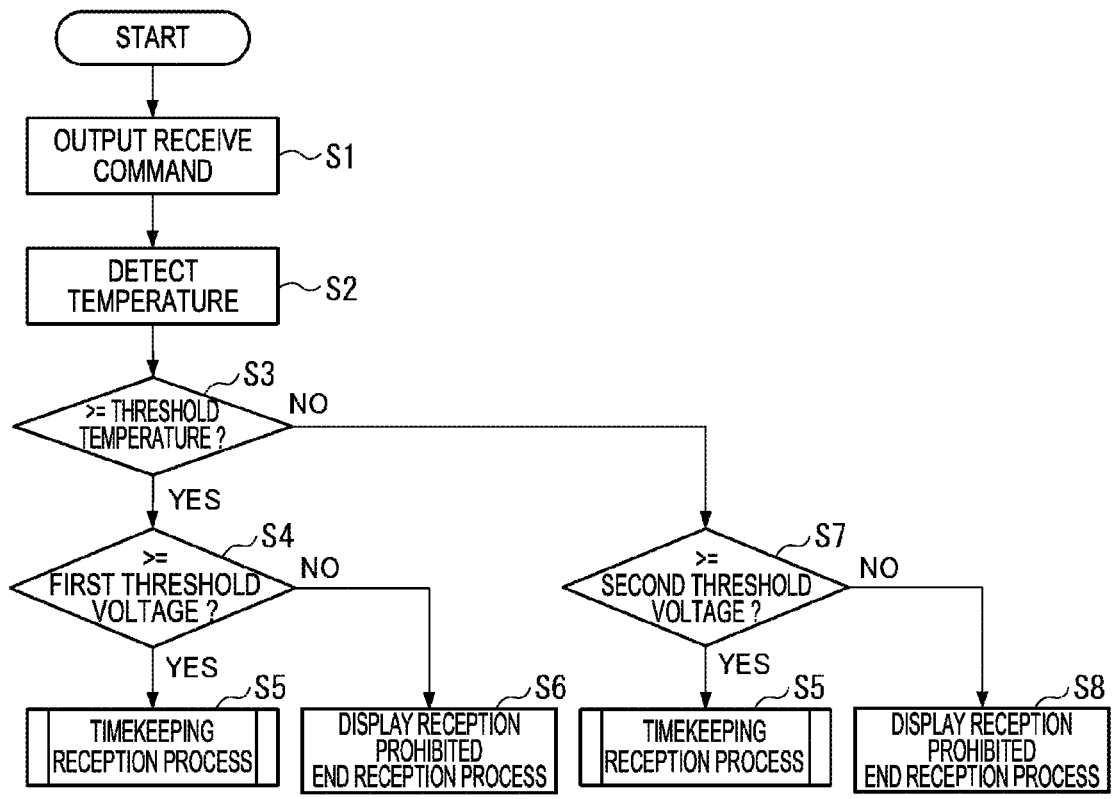
FIG. 6 is a flow chart of the reception process in a first embodiment.

As shown in FIG. 6, the reception command unit 630 outputs a receive command for executing the timekeeping reception process to the temperature detection controller 650 when a specific operation is detected or a specific condition is met as described above (S1).

When a receive command is output in S1, the temperature detection controller 650 operates the temperature detector 67 to detect the temperature (S2).

The reception controller 660 determines whether or not to allow the reception process based on the temperature detected by the temperature detection controller 650 and the battery voltage detected by the voltage detection controller 640. More specifically, the reception controller 660 compares a threshold voltage set for the detected temperature with the detected battery voltage, and allows the reception process when the battery voltage is greater than or equal to the threshold voltage. Note that threshold data (threshold temperature information) related to the threshold voltage corresponding to the temperature is previously stored in the storage 69. The reception controller 660 references this threshold data to acquire the threshold.

Because the internal resistance of the storage battery 24 increases as the temperature drops, the voltage drop from the reception process increases as the temperature decreases. As a result, a first threshold voltage (a first threshold, such as 3.6 V) is set for a first temperature range above a threshold temperature (such as 0° C.), and a second threshold voltage (a second threshold, such as 3.7 V) that is higher than the first threshold voltage is set for a second temperature range that is below the threshold temperature.

Note that the threshold voltage is set to a level at which there is no chance of the control unit 61 shutting down due to a drop in the storage battery 24 voltage even if the positioning reception process, which consumes more power than the timekeeping reception process, executes.

Figure 7:
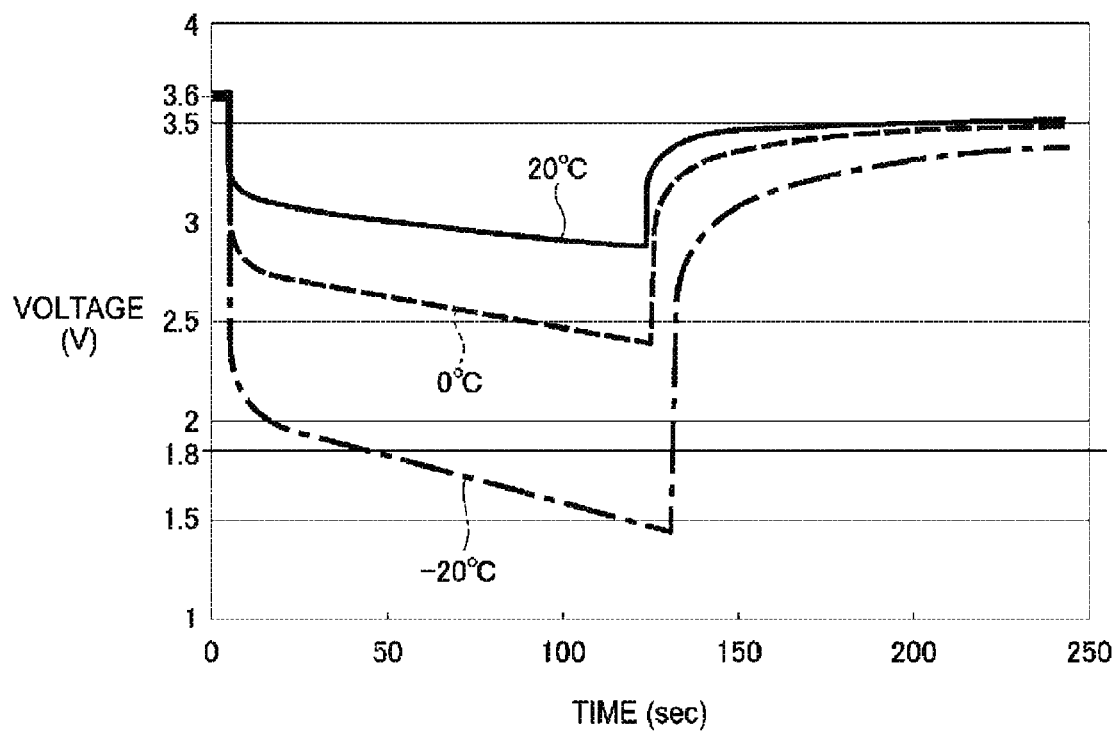
FIG. 7 is a graph showing the change in the voltage of the storage battery during the reception process.
Figure 8:
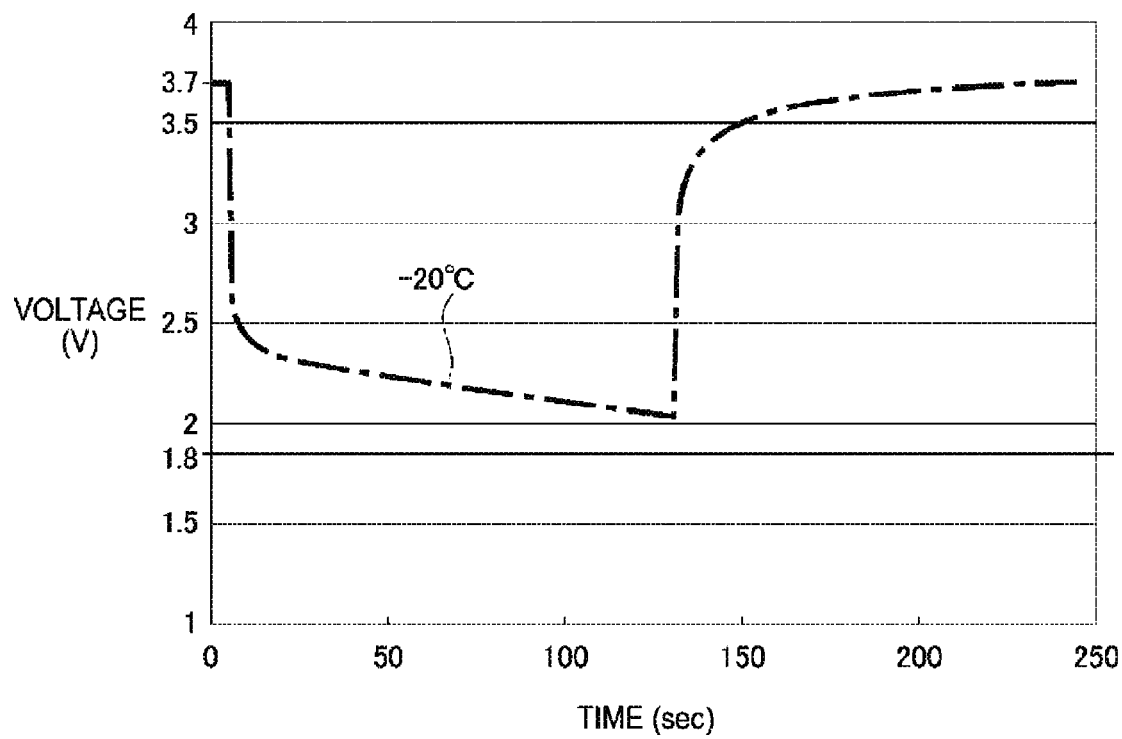
FIG. 8 is a graph showing the change in the voltage of the storage battery during the reception process.

An example of the relationship between temperature and the time change in the battery voltage when the positioning reception process is executed as the reception process is shown in FIG. 7 and FIG. 8. FIG. 7 shows the relationship between voltage and time when the temperature is 20° C., 0° C., −20° C., and FIG. 8 shows the same when the temperature is 20° C. FIG. 7 is a graph of the relationship when the battery voltage is 3.6V, and FIG. 8 is a graph of the relationship when the battery voltage is 3.7 V.

As shown in FIG. 7, if the battery voltage is 3.6 V when the reception process starts and the temperature is 0° C. or more, the battery voltage remains greater than or equal to the sustain voltage (such as 1.8 V) at which the system will not shut down even if the positioning reception process executes. However, if the temperature is −20° C., the battery voltage will go below the sustain voltage due to the voltage drop resulting from the positioning reception process.

As shown in FIG. 8, however, if the battery voltage is 3.7 V when the reception process starts, the battery voltage remains greater than or equal to the sustain voltage even if the positioning reception process executes.

In one example of this embodiment, therefore, if the threshold temperature is set at 0° C., the first threshold voltage set for the first temperature range above the threshold temperature is 3.6 V, and the second threshold voltage set for the second temperature range below the threshold temperature is 3.7 V.

Referring again to FIG. 6, the allow-reception decision unit 661 determines if the detected temperature is greater than or equal to the threshold temperature (S3).

If the allow-reception decision unit 661 determines in S3 that the detected temperature is greater than or equal to the threshold temperature (YES), it references the threshold data stored in the storage 69 and acquires the first threshold voltage corresponding to the detected temperature. The allow-reception decision unit 661 then determines if the detected battery voltage is greater than or equal to the first threshold voltage (S4). If in S4 the voltage is determined to be greater than or equal to the first threshold voltage (YES), the allow-reception decision unit 661 permits executing the reception process, and prohibits the reception process if the voltage is less than the first threshold voltage (NO). More specifically, the allow-reception decision unit 661 compares the first threshold voltage and the battery voltage and determines whether or not to allow the reception process in the first temperature range.

If the voltage is greater than or equal to the first threshold voltage (S4: YES) and the reception process is allowed, the reception controller 660 runs the timekeeping reception process (S5). The timekeeping reception process S5 is described further below.

If the voltage is less than the first threshold voltage (S4: NO) and the reception process is prohibited, the reception controller 660 does not run the reception process, the display controller 620 moves the second hand 31 that was indicating the second in the normal mode to the N marker as the reception-prohibited state information indicating that reception is prohibited (S6), and ends the reception process.

If the temperature is determined to be less than the threshold temperature (S3: NO), the allow-reception decision unit 661 determines if the detected battery voltage is greater than or equal to the second threshold voltage (S7). The allow-reception decision unit 661 allows the reception process if the detected battery voltage is greater than or equal to the second threshold voltage (S7: YES), and prohibits the reception process if the voltage is less than the second threshold voltage (NO). More specifically, the allow-reception decision unit 661 compares the second threshold voltage and the battery voltage in the second temperature range to determine whether or not to allow the reception process.

If the voltage is greater than or equal to the second threshold voltage (S7: YES) and the reception process is allowed, the reception controller 660 runs the timekeeping reception process (S5).

If the voltage is less than the second threshold voltage (S7: NO) and the reception process is prohibited, the display controller 620 moves the second hand 31 to the N marker (S8) and the control unit 61 ends the reception process as in S6.

Timekeeping Reception Process

Figure 9:
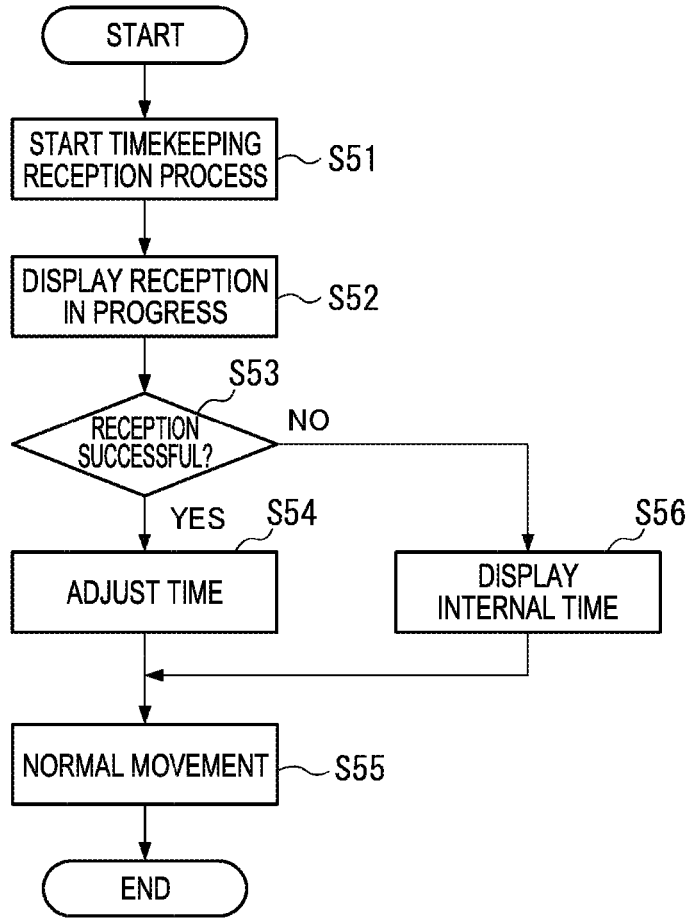
FIG. 9 is a flow chart of the timekeeping reception process of the reception process in the first embodiment.

The timekeeping reception process S5 in FIG. 6 is described next with reference to FIG. 9.

The timekeeping reception controller 662 first operates the reception module 50 to start time reception (S51).

When the reception module 50 starts the timekeeping reception process starts, the display controller 620 moves the second hand 31 to indicate that timekeeping reception is in progress (S52). More specifically, during the timekeeping reception process the display controller 620 points the second hand 31 to the 1 marker at the 38 second position of the dial 2. As a result, the second hand 31 and dial 2 embody a reception state display unit that indicates the timekeeping reception process is running.

Next, the reception success decision unit 664 determines if timekeeping reception was successful (S53).

The reception success decision unit 664 determines if time data (Z count) was acquired by the reception module 50, returns YES if it was acquired, and returns NO if not acquired.

The timekeeping reception controller 662 operates the reception module 50 to lock onto at least one GPS satellite S, receive satellite signals, and acquire the Z count (time information) transmitted every 6 seconds from the GPS satellites S.

If, for example, a satellite signal cannot be acquired within a specific timeout period (such as 1-2 minutes) after the timekeeping reception process starts, the reception success decision unit 664 returns NO indicating that a satellite could not be locked.

Even if a satellite is locked, the reception success decision unit 664 returns NO if operation times out before the time data is acquired. Note that because the Z count is transmitted every 6 seconds in a GPS satellite signal, a Z count can be received five times before operation times out.

If reception is successful (S53: YES), the time information correction unitor 610 corrects the time information based on the acquired time data (S54).

When the time information corrector 610 corrects the time information, the display controller 620 adjusts the time displayed by the hands 3 through the drive circuit 62, and then returns to normal operation of the movement (S55).

If reception is not successful (S53: NO), the reception process of the timekeeping reception controller 662 ends, the internal time is displayed (S56), and normal operation of the movement resumes (S55).

Processing when the timekeeping reception operation is performed thus ends.

This embodiment describes operation when the timekeeping reception process is executed, but when the positioning reception process is executed in response to detecting the positioning reception operation, the same process executes except for substituting the positioning reception process for the timekeeping reception process.

Effect of Embodiment 1

When the temperature detected by the temperature detector 67 is greater than or equal to the threshold temperature, the reception controller 660 allows running the reception process if the battery voltage detected by the voltage detection circuit 74 is greater than or equal to the first threshold voltage. If the detected temperature is less than the threshold temperature, the reception process is allowed if the detected battery voltage is greater than or equal to the second threshold voltage. The reception controller 660 in this embodiment thus determines whether or not to run the reception process based on the threshold voltage set for the temperature. As a result, even if the internal resistance of the storage battery 24 rises because of a drop in temperature, and the voltage drop due to the reception process increases, a threshold voltage that is more appropriate for the temperature can be set and a system shutdown can be reliably prevented.

In addition, a threshold voltage is set for a first temperature range at or above a threshold temperature, and another threshold voltage is set for a second temperature range below the threshold temperature. As a result, by setting a first threshold that is lower than the second threshold in the first temperature range, which is a temperature range above the second temperature range, the reception process not executing even though the reception process can actually be allowed is suppressed and there are more reception opportunities than when only a second threshold is set to prevent system shutdowns in a second temperature range below the threshold temperature.

The display controller 620 indicates that reception is in progress while the reception process runs, and indicates that reception is prohibited if the reception process is not allowed. Whether or not the reception process is running, and whether or not reception is prohibited, can be easily known. As a result, while the reception process is running, the user can be prompted to maintain the current posture of the timepiece in a location where satellite signals can be easily received, and the success rate of the reception process can be improved. The user can also be informed that the reception process must be run again after recharging because the reception process was not executed because the supply voltage dropped.

The storage 69 stores threshold data (threshold temperature information) for acquiring the threshold voltage appropriate to the detected temperature, and the reception controller 660 acquires the threshold voltage corresponding to the temperature based on the detected temperature and the stored threshold data. Thus comprised, the threshold voltage appropriate to the temperature can be easily acquired by referencing threshold data previously stored in the storage 69. Furthermore, by updating the threshold data appropriately to the current voltage characteristic, whether or not to execute the reception process can be appropriately determined even if the voltage characteristic of the storage battery 24 changes due to changes in the storage battery 24 design or changes due to age. Updating to threshold data appropriately to the voltage characteristic is also simple, and serviceability and versatility can be improved.

Embodiment 2

A second embodiment is described next with reference to FIG. 10.

In an electronic timepiece according to the second embodiment, multiple threshold temperatures are set, and a threshold voltage is set for each of the three or more temperature ranges demarcated by the plural threshold temperatures. The electronic timepiece runs the reception process when the detected battery voltage is greater than the threshold voltage corresponding to the detected temperature.

Note that configurations that are the same or similar to configurations described in the foregoing embodiment are identified by the same reference numerals, and further description thereof is omitted or abbreviated.

Reception Process

As in the first embodiment described above, processing when the timekeeping reception process is executed in this embodiment as the reception process is described next with reference to FIG. 10.

A first threshold temperature (such as 0° C.) and a second threshold temperature (−10° C.) are set as the plural threshold temperatures in this embodiment. A first threshold voltage (such as 3.6 V) is set for a first temperature range above or equal to the first threshold temperature, a second threshold voltage (such as 3.65 V) is set for a second temperature range that is less than the first threshold temperature and greater than or equal to the second threshold temperature, and a third threshold voltage (such as 3.7 V) is set for a third temperature range that is below the second threshold temperature. The allow-reception decision unit 661 determines in which of the plural temperature ranges the detected temperature belongs, and executes the reception process if the battery voltage is greater than or equal to the threshold voltage set for that temperature range.

Figure 10:
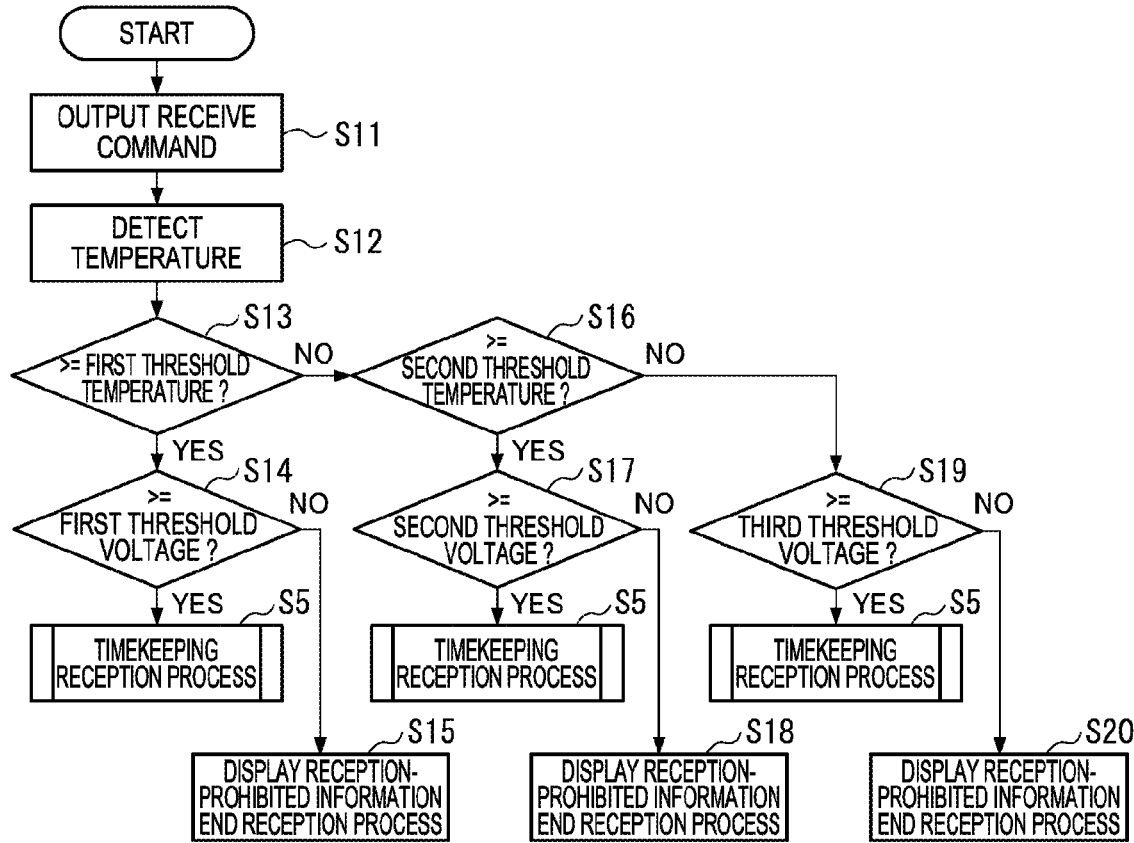
FIG. 10 is a flowchart of the reception process in a second embodiment.

As shown in FIG. 10, the reception command unit 630 outputs a receive command for executing the timekeeping reception process to the temperature detection controller 650 when a specific operation is detected or a specific condition is met as described above (S11).

When the receive command is output in S11, the temperature detection controller 650 operates the temperature detector 67 to detect the temperature (S12).

The allow-reception decision unit 661 then determines if the detected temperature is greater than or equal to the first threshold temperature (such as 0° C.) (S13).

If the allow-reception decision unit 661 determines in S13 that the detected temperature is greater than or equal to the first threshold temperature (YES), it executes the same process from S14 as the process from S4 in the reception process of the first embodiment shown in FIG. 6. More specifically, the allow-reception decision unit 661 determines if the detected temperature is greater than or equal to the first threshold voltage (S14), and the reception controller 660 executes the timekeeping reception process (S5) if the allow-reception decision unit 661 determines in S14 that the voltage is greater than or equal to the first threshold voltage (YES). If the voltage is determined to be less than the first threshold voltage in S14, the display controller 620 indicates that reception is prohibited and the control unit 61 ends the reception process (S15).

However, if in S13 the temperature is determined to be less than the first threshold temperature (NO), the allow-reception decision unit 661 determines if the detected temperature is greater than or equal to the second threshold temperature (such as −10° C.) (S16). If the temperature is greater than or equal to the second threshold temperature (S16: YES), the same process executed from step S7 in the reception process of the first embodiment shown in FIG. 6 executes from S17. Note that the second threshold voltage in this embodiment is set to 3.65 V, for example. The allow-reception decision unit 661 therefore determines if the detected temperature is greater than or equal to the second threshold voltage (S17), and if in S17 the voltage is determined to be greater than or equal to the second threshold voltage (YES), the reception controller 660 executes the timekeeping reception process (S5). If the voltage is determined to be less than the second threshold voltage in S17, the display controller 620 indicates that reception is prohibited and the control unit 61 ends the reception process (S18).

However, if in S16 the temperature is determined to be less than the second threshold temperature (NO), the allow-reception decision unit 661 determines if the detected voltage is greater than or equal to the third threshold voltage (such as 3.7 V) (S19). If in S19 the voltage is greater than or equal to the second threshold voltage (YES) and the reception process is allowed, the reception controller 660 executes the timekeeping reception process (S5).

If in S19 the voltage is less than the second threshold voltage (NO) and the reception process is prohibited, the reception controller 660 does not execute the reception process, and the display controller 620 moves the second hand 31 that was indicating the second in the normal mode to the N marker as the reception-blocked state information indicating that reception is prohibited (S20), and the control unit 61 ends the reception process.

Effect of Embodiment 2

This embodiment sets a threshold voltage for each of three temperature ranges, and the reception controller 660 allows the reception process if the detected battery voltage is greater than or equal to the threshold voltage corresponding to the detected temperature. As a result, as described above, compared with when a threshold voltage is set for each of two temperature ranges, or a single threshold voltage is set regardless of temperature, whether or not to execute the reception process can be determined more appropriately considering the temperature change of the processor load (voltage drop) of the reception process. More specifically, when the temperature range of the anticipated use is divided into multiple temperature ranges, a lower threshold voltage can be set in higher temperature ranges. As a result, the reception process not being allowed even though the reception process could actually be allowed, and chances for reception therefore being lost, when the battery voltage at which the reception process can execute at the detected temperature is lower than the threshold voltage that is set for that temperature can be suppressed, and opportunities for reception can be increased.

Embodiment 3

A third embodiment is described next with reference to FIG. 11 to FIG. 13.

An electronic timepiece according to the third embodiment differs from the first embodiment in that different threshold voltages are set for the timekeeping reception process and the positioning reception process, and whether or not to execute the reception process is determined using the threshold voltage corresponding to the type of reception process to execute.

Reception Process

The reception process in this embodiment is described next with reference to FIG. 11 and FIG. 12.

A single threshold temperature (such as 0° C.) is set in this embodiment. Separate threshold voltages for the timekeeping reception process and the positioning reception process are set for a first temperature range (greater than or equal to 0° C.) and a second temperature range (less than 0° C.) demarcated by the threshold temperature (0° C.).

More specifically, as shown in table 1 below, a first timekeeping threshold voltage (such as 3.55 V) for the first temperature range, and a second timekeeping threshold voltage (such as 3.65 V) for the second temperature range, are set as the threshold voltages (second threshold) for allowing the timekeeping reception process. In addition, a first positioning threshold voltage (such as 3.6 V) for the first temperature range, and a second positioning threshold voltage (such as 3.7 V) for the second temperature range, are set as the threshold voltages (first threshold) for allowing the positioning reception process.

The allow-reception decision unit 661 permits executing the reception process when the detected battery voltage is greater than or equal to the threshold voltage corresponding to the type of reception process and the detected temperature.

TABLE 1

|  | >=0° C. | <0° C. |
| --- | --- | --- |
| Timekeeping threshold voltage | 3.55 V | 3.65 V |
| Positioning threshold voltage | 3.6 V | 3.7 V |

Figure 11:
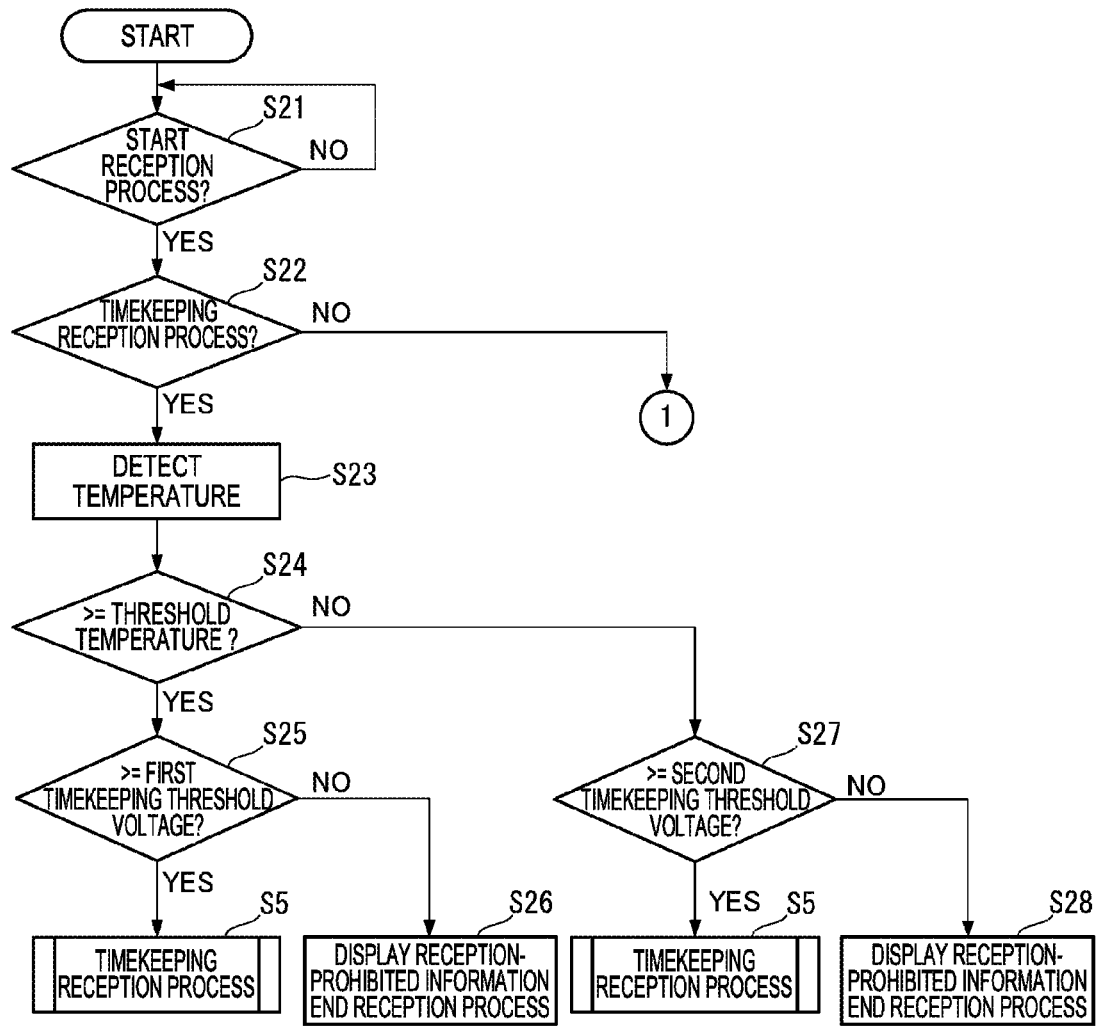
FIG. 11 is a flow chart of a reception process in a third embodiment.

The reception command unit 630 determines whether or not to start the reception process as shown in FIG. 11 (S21). The reception command unit 630 returns YES in S21 when a specific operation is detected or a specific condition is met as described above, and otherwise returns NO.

If the reception command unit 630 determines to start the reception process in S21 (YES), it then determines if the reception process to execute is the timekeeping reception process (S22). When a specific operation is detected (manual reception timing) or a specific condition is met (automatic reception timing) as described above, the reception command unit 630 returns YES in S21 to start the reception process, and in S22 determines the reception process to execute is the timekeeping reception process (YES).

If the reception process to execute is determined in S22 to be the timekeeping reception process (YES), the control unit 61 executes the same process from S23 as the process executed from S2 in the first embodiment shown in FIG. 6. More specifically, the temperature detection controller 650 operates the temperature detector 67 to detect the temperature (S23). If the detected temperature is greater than or equal to the threshold temperature (S24: YES), and the detected battery voltage is greater than or equal to the first timekeeping threshold voltage (S25: YES), the timekeeping reception process is executed (S5). However, if the battery voltage is less than the first timekeeping threshold voltage (S25: NO), that reception is prohibited is indicated and the reception process ends (S26). If the detected temperature is less than the threshold temperature (S24: NO), and the detected battery voltage is greater than or equal to the second timekeeping threshold voltage (S27: YES), the timekeeping reception process is executed (S5). However, if the battery voltage is less than the second timekeeping threshold voltage (S27: NO), that reception is prohibited is indicated and the reception process ends (S26).

Figure 12:
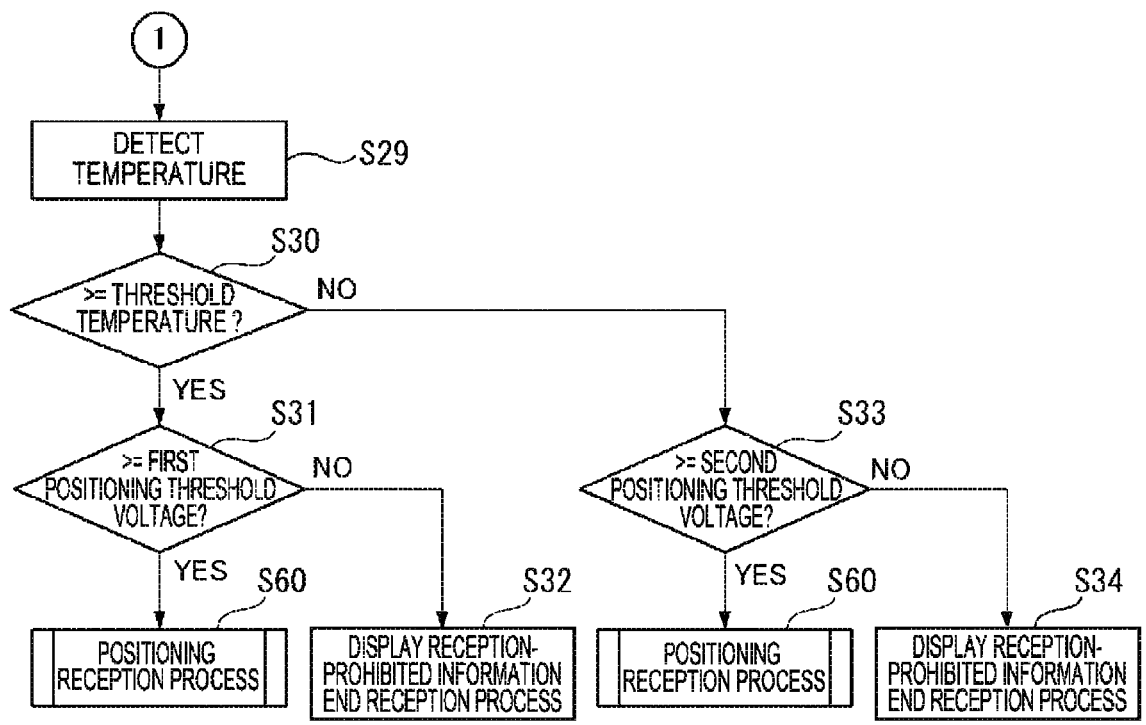
FIG. 12 is a flow chart of a reception process in a third embodiment.
Figure 13:
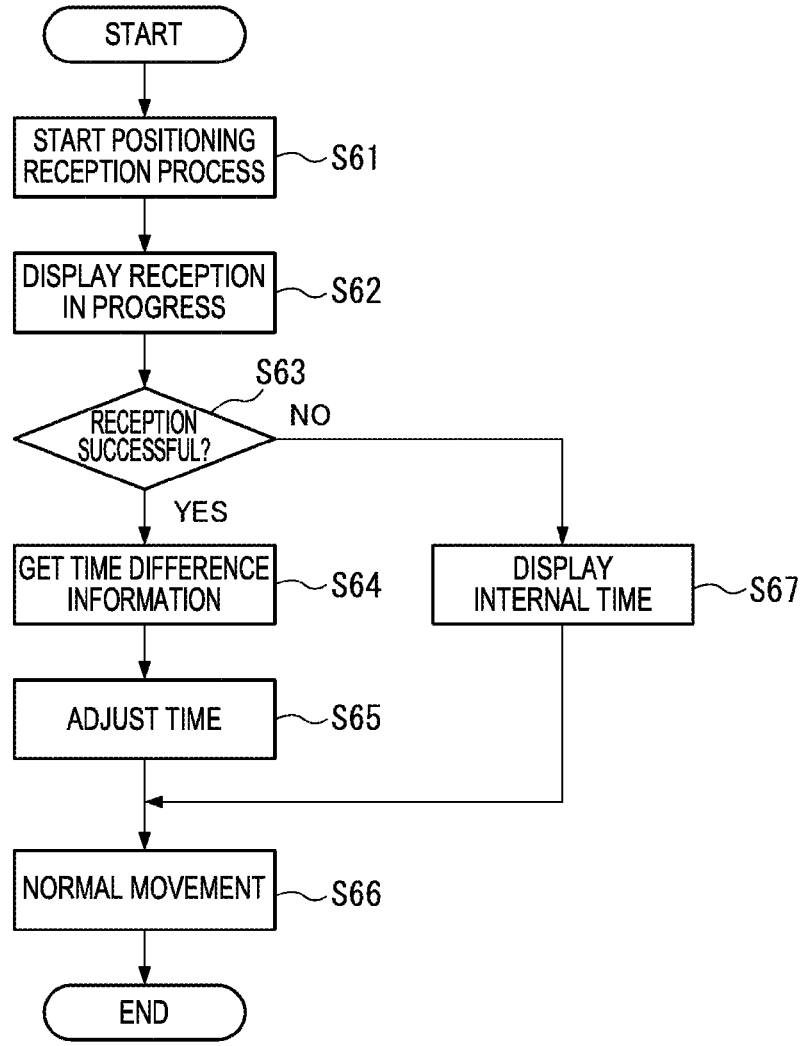
FIG. 13 is a flowchart of the positioning reception process in the reception process of the third embodiment.

However, if button 7 is pushed for a second set time or longer, that is, if the positioning reception operation is performed, the reception process to execute is determined in S22 to be the positioning reception process (NO), and as shown in FIG. 12, the temperature detection controller 650 operates the temperature detector 67 to detect the temperature (S29).

The reception controller 660 determines then whether or not to allow the positioning reception process based on the detected temperature and the battery voltage previously detected by the voltage detection controller 640. Note that the decision process of the reception controller 660 determining whether or not to allow the positioning reception process is the same as the timekeeping reception process except for the threshold voltages that are used, and further description thereof is omitted.

More specifically, the allow-reception decision unit 661 determines if the detected temperature is greater than or equal to the threshold temperature (S30).

If the allow-reception decision unit 661 determines in S30 that the detected temperature is greater than or equal to the threshold temperature (YES), it determines if the detected battery voltage is greater than or equal to the first positioning threshold voltage (S31). If the battery voltage is greater than or equal to the first positioning threshold voltage (S31: YES), the allow-reception decision unit 661 allows the positioning reception process and the reception controller 660 executes the positioning reception process (S60). The positioning reception process S60 is described further below.

However, if in S31 the battery voltage is less than the first positioning threshold voltage (NO), the allow-reception decision unit 661 prohibits the positioning reception process. The display controller 620 therefore moves the second hand 31 that was indicating the second in the normal mode to the N marker as the reception-blocked state information indicating that reception is prohibited, and the control unit 61 ends the reception process (S32).

If in S30 the detected temperature is less than the threshold temperature (NO), the allow-reception decision unit 661 determines if the detected battery voltage is greater than or equal to the second positioning threshold voltage (S33). If in S33 the battery voltage is greater than or equal to the second positioning threshold voltage (YES), the allow-reception decision unit 661 allows the positioning reception process and the reception controller 660 executes the positioning reception process (S60).

However, if in S33 the battery voltage is less than the second positioning threshold voltage (NO), the allow-reception decision unit 661 prohibits the positioning reception process.

As in S32, the display controller 620 moves the second-hand 31 to the N marker to indicate that reception is prohibited, and the control unit 61 ends the reception process (S34).

Positioning Reception Process

The positioning reception process S60 shown in FIG. 12 is described next with reference to FIG. 13. The positioning reception controller 663 starts the positioning reception process (S61) when the positioning reception process is allowed.

The positioning reception controller 663 operates the reception module 50 to lock onto the specific number of GPS satellites S required for positioning (at least 3, preferably 4), receive signals, and acquire the satellite orbit data (ephemeris). The timekeeping reception controller 662 also operates the reception module 50 to acquire the Z count (time information) transmitted from the GPS satellites S every 6 seconds.

When the satellite orbit data is acquired, the reception module 50 performs a positioning calculation based on the satellite orbit data to calculate the location, retrieves the time difference data corresponding to the calculated location from the time difference database stored in flash memory 54, and outputs to the control unit 61.

When the positioning reception process starts, the display controller 620 indicates that the positioning process is in progress with the second hand 31 (S62). More specifically, while the positioning reception process executes, the display controller 620 sets the second hand 31 to the 4+ marker at the 52 second position on the dial 2. The second hand 31 and dial 2 thus embody a reception state display unit that indicates the positioning reception process is executing.

The reception success decision unit 664 then determines if positioning reception was successful (S63). The reception success decision unit 664 determines if the satellite orbit data and time information (Z count) were acquired by the reception module 50, returns YES if acquired, and returns NO if not acquired. If, for example, satellites cannot be locked within a specific timeout period after the positioning reception process starts, or the timeout time for calculating the location passes, the reception success decision unit 664 returns NO.

If reception is successful (S63: YES), the time information corrector 610 acquires the time difference information from the reception module 50 (S64).

The time information corrector 610 then adjusts the time using the acquired time difference information (S65). When the time information corrector 610 corrects the time, the display controller 620 adjusts the hands 3 through the drive circuit 62 based on the corrected time information, and then returns to normal operation of the movement (S66).

If reception failed and S63 returns NO, the positioning reception controller 663 ends the reception process and displays the internal time (S67). Next, the control unit 61 returns to normal operation of the movement (S66). The positioning reception process thus ends.

Effect of Embodiment 3

The reception controller 660 executes the positioning reception process or the timekeeping reception process according to the operation command. More specifically, when a command instructing the positioning reception process is output, the reception controller 660 executes the positioning reception process if the battery voltage is greater than or equal to the positioning threshold voltage (first threshold) corresponding to the temperature, and does not execute the positioning reception process if less than the threshold. When a command instructing the timekeeping reception process is output, the reception controller 660 executes the timekeeping reception process if the battery voltage is greater than or equal to the timekeeping threshold voltage (second threshold) corresponding to the temperature, and does not execute the timekeeping reception process if less than the threshold. This timekeeping threshold voltage is lower than the positioning threshold voltage set for the same temperature. In other words, the positioning threshold voltage is greater than the timekeeping threshold voltage set for the same temperature.

As a result, a system shutdown caused by the positioning reception process, which consumes more power than the timekeeping reception process, executing when the battery voltage is lower than the positioning threshold voltage can be prevented. A system shutdown caused by the timekeeping reception process executing when the battery voltage is lower than the timekeeping threshold voltage can also be prevented.

Furthermore, by setting a timekeeping threshold voltage, the timekeeping reception process can be executed when the battery voltage is greater than or equal to the timekeeping threshold voltage but less than the positioning threshold voltage at which the positioning reception process is not allowed. As a result, more opportunities to execute the timekeeping reception process can be created than when only a positioning threshold voltage for the positioning reception process, which consumes more power than the timekeeping reception process, is set to prevent a system shutdown.

Embodiment 4

A fourth embodiment is described next with reference to FIG. 14 and FIG. 15.

An electronic timepiece according to the fourth embodiment of differs from the electronic timepiece according to the first embodiment in having a state information display unit for displaying state information based on the detected temperature and battery voltage.

Figure 14:
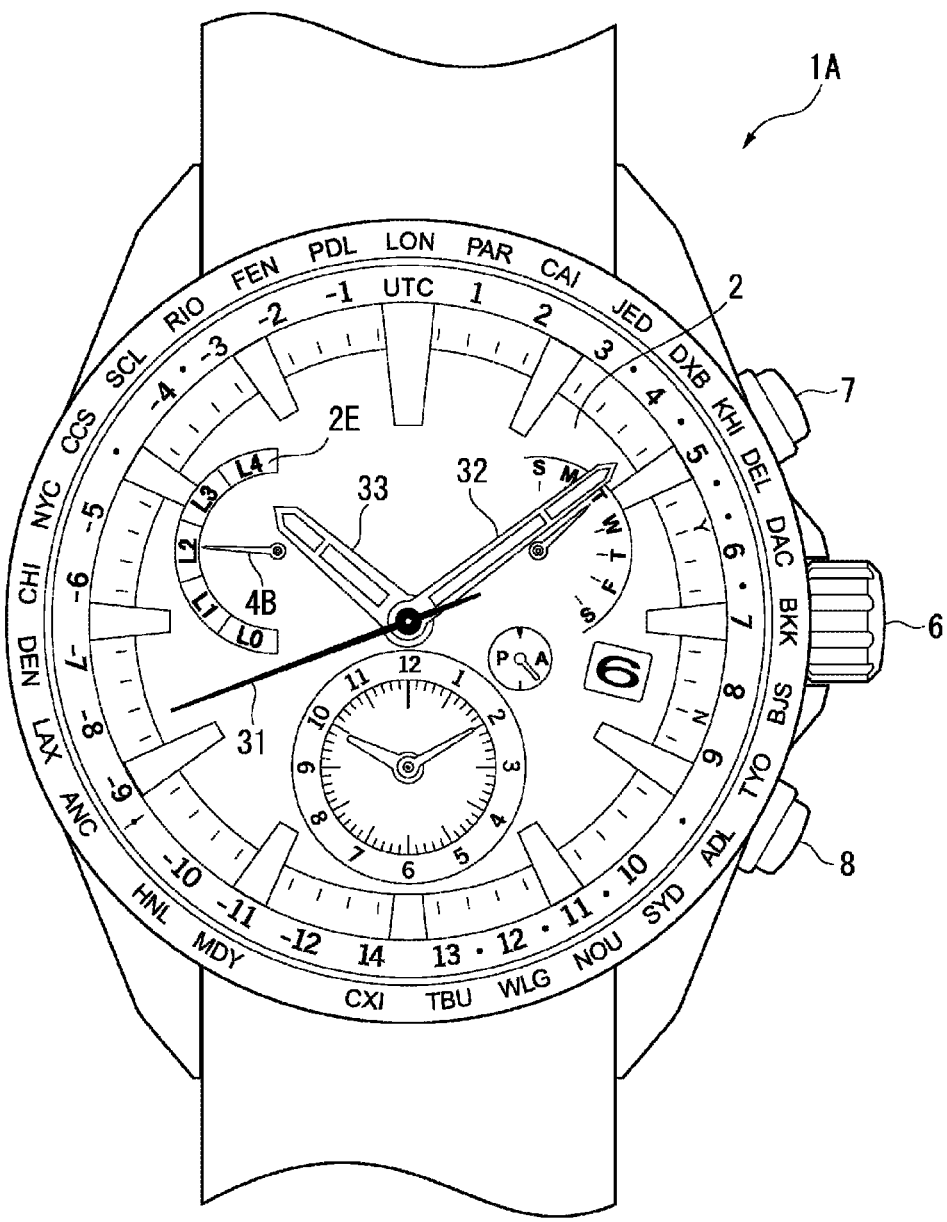
FIG. 14 is a plan view of an electronic timepiece according to a fourth embodiment.
Figure 15:
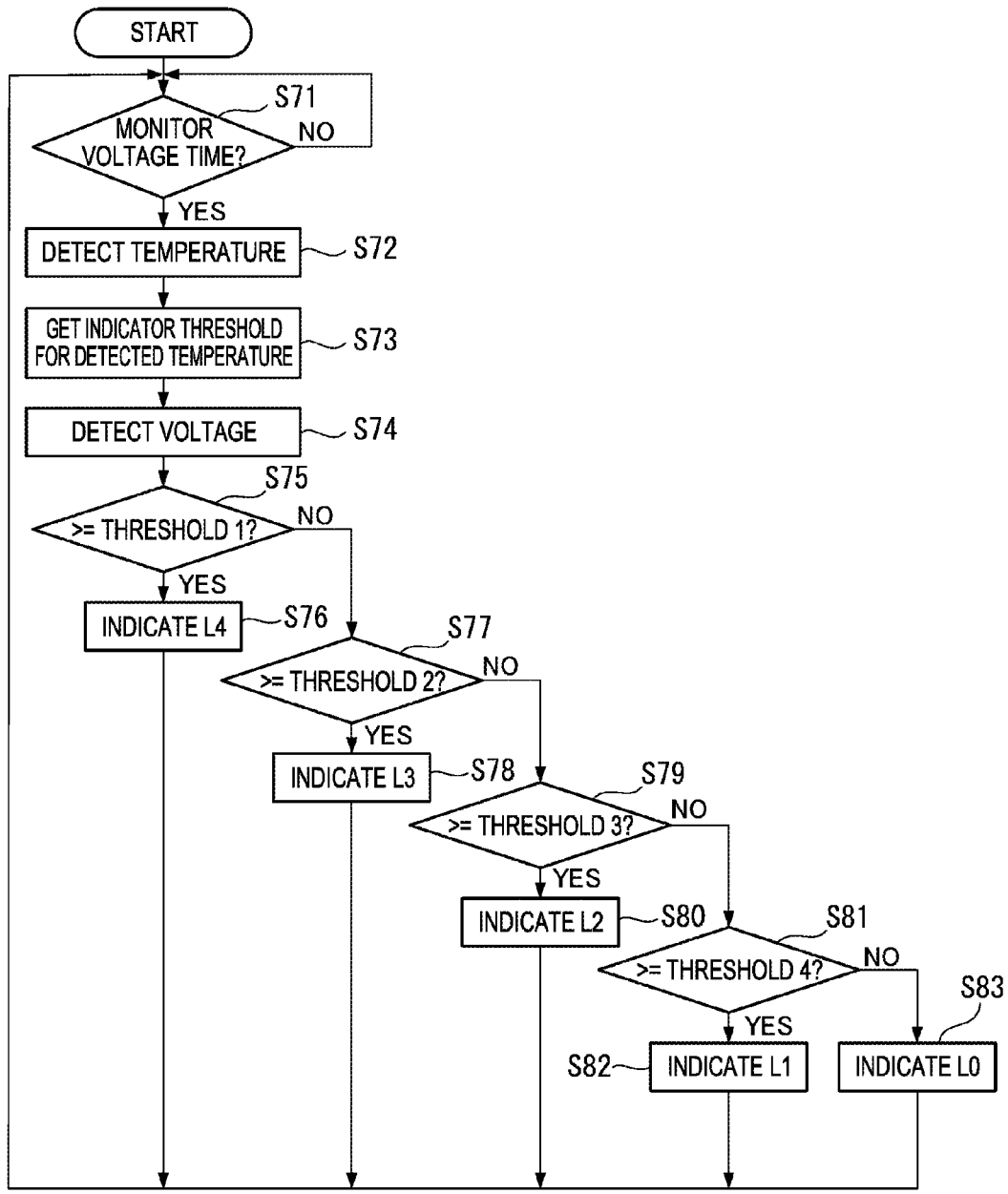
FIG. 15 is a flow chart of a state display process in the fourth embodiment.

As shown in FIG. 14, the electronic timepiece 1A has a state information display unit including a subdial 2E on the dial 2 and a hand 4B. The state information display unit displays the type of reception process that can execute, or how long operation can continue without recharging, as the state information of the electronic timepiece 1A corresponding to the detected battery voltage and temperature.

Markers L0, L1, L2, L3, L4 corresponding to the state information are presented on the subdial 2E. State information corresponding to temperature ranges and battery voltage ranges are set for each marker as shown in table 2. In this embodiment, the markers L0, L1, L2, L3, L4 represent information related to the type of reception process that can execute and the remaining battery power. By setting the hand 4B to the marker L0, L1, L2, L3, L4 corresponding to the detected temperature and battery voltage, state information corresponding to the detection result is displayed in the state information display unit. For example, if the temperature is greater than or equal to 0° C. and the battery voltage is greater than or equal to 3.6 V and less than 3.7 V, the hand 4B is set to the L1 marker.

Note that markers L2 to L4 are equivalent to reception-allowed state information and positioning-allowed state information indicating that executing the timekeeping reception process or positioning reception process is allowed. The L1 marker is equivalent to reception-allowed state information and timekeeping-allowed reception information indicating that the positioning reception process is prohibited but the timekeeping reception process is allowed, and is equivalent to reception-prohibited information related to the positioning reception process. The L0 marker is equivalent to reception-prohibited state information indicating the timekeeping reception process and the positioning reception process are prohibited from executing.

TABLE 2

| | STATE INFORMATION | | | BATTERY VOLTAGE vs TEMPERATURE RANGE SETTINGS | | |
| --- | --- | --- | --- | --- | --- | --- |
| Marker | Timekeeping | Positioning | Reserve power (remaining battery capacity) | 0° C.<= | −10° C.-0° C. | <−10° C. |
| L4 | yes | yes | 2 yr | 3.9-4.2 V | 4.0-4.2 V | 4.1-4.2 V |
| L3 | yes | yes | 1 yr | 3.8-3.9 V | 3.9-4.0 V | 4.0-4.1 V |

TABLE 2-continued

| | STATE INFORMATION | | | BATTERY VOLTAGE vs TEMPERATURE RANGE SETTINGS | | |
|---|---|---|---|---|---|---|
| Marker | Timekeeping | Positioning | Reserve power (remaining battery capacity) | 0° C.<= | −10° C.-0° C. | <−10° C. |
| L2 | yes | yes | ½ yr | 3.7-3.8 V | 3.8-3.9 V | 3.9-4.0 V |
| L1 | yes | no | charge warning | 3.6-3.7 V | 3.7-3.8 V | 3.8-3.9 V |
| L0 | no | no | charge warning | <3.6 V | <3.7 V | <3.8 V |

Based on the temperature detected by the temperature detector 67 and the battery voltage detected by the voltage detection circuit 74, the display controller 620 (FIG. 5) moves the hand 4B of the state information display unit to indicate the state information corresponding to the detected temperature and battery voltage.

Note that state evaluation data for determining the state information corresponding to the temperature and battery voltage ranges is stored in the storage 69. The display controller 620 references this state evaluation data to display the state information corresponding to the temperature and battery voltage in the state information display unit.

State Display Process

The state display process is described next with reference to FIG. 15. The voltage detection controller 640 determines if it is time to monitor the voltage during normal operation of the movement (S71). If S71 returns NO, the voltage detection controller 640 repeats the evaluation. Note that the timing for checking the voltage is the specific voltage detection timing of the voltage detection controller 640 (such as every 5 to 10 seconds).

If it is time to check the voltage (S71: YES), the temperature detection controller 650 operates the temperature detector 67 to detect the temperature (S72).

The display controller 620 references the state evaluation data stored in the storage 69, and acquires the state evaluation threshold (indicator threshold) for the temperature detected in S72 (S73).

The state evaluation threshold is a battery voltage threshold for determining which state information to indicate with the five markers L0 to L4 based on the detected temperature and battery voltage. As shown in the example in table 3, state evaluation thresholds are set for plural temperature ranges, and previously stored in the storage 69 as state evaluation data.

TABLE 3

| State evaluation threshold | 0° C.<= | −10° C.-0° C. | <−10° C. |
|---|---|---|---|
| Threshold 1 | 3.9 V | 4.0 V | 4.1 V |
| Threshold 2 | 3.8 V | 3.9 V | 4.0 V |
| Threshold 3 | 3.7 V | 3.8 V | 3.9 V |
| Threshold 4 | 3.6 V | 3.7 V | 3.8 V |

As shown in table 3, these thresholds are the minimums of the voltage ranges for the temperature ranges shown in table 2.

In this embodiment, state evaluation thresholds are set for the first temperature range greater than or equal to 0° C., the second temperature range greater than or equal to −10° C. and less than 0° C., and the third temperature range less than −10° C.

A battery voltage greater than or equal to the first threshold corresponds to state L4. A battery voltage less than the first threshold and greater than or equal to the second threshold corresponds to state L3. A battery voltage less than the second threshold and greater than or equal to the third threshold corresponds to state L2. A battery voltage less than the third threshold and greater than or equal to the fourth threshold corresponds to state L1. A battery voltage less than the fourth threshold corresponds to state L0. The thresholds increase as the temperature range decreases and the internal resistance of the storage battery 24 increases.

Once the state evaluation threshold corresponding to the temperature is acquired in S73, the voltage detection controller 640 operates the voltage detection circuit 74 to detect the battery voltage (S74).

The display controller 620 compares the first threshold from the state evaluation threshold values acquired in S73 with the battery voltage detected in S73, and determines if the battery voltage is greater than or equal to the first threshold (S75). For example, if the temperature detected in S72 is in the first temperature range, the display controller 620 compares the first threshold (3.9 V) of the state evaluation threshold values set for the first temperature range with the battery voltage.

If the temperature is greater than or equal to the first threshold (S75: YES), the display controller 620 moves the hand 4B to the L4 marker and indicates L4 in the state information display unit (S76). However, if the temperature is less than the first threshold (S75: NO), the display controller 620 determines if the battery voltage is greater than or equal to the second threshold (S77). If the temperature is greater than or equal to the second threshold (S77: YES), the display controller 620 moves the hand 4B to the L3 marker in the state information display unit (S78).

However, if the temperature is less than the second threshold (S77: NO), the display controller 620 determines if the battery voltage is greater than or equal to the third threshold (S79).

If the temperature is greater than or equal to the third threshold (S79: YES), the display controller 620 moves the hand 4B to the L2 marker in the state information display unit (S80).

However, if the temperature is less than the third threshold (S79: NO), the display controller 620 determines if the battery voltage is greater than or equal to the fourth threshold (S81). If the battery voltage is greater than or equal to the fourth threshold (S81: YES), the display controller 620 moves the hand 4B to the L1 marker in the state information display unit (S82).

If the battery voltage is less than the fourth threshold (S81: NO), the display controller 620 moves the hand 4B to the L0 marker in the state information display unit (S83).

After indicating the state information in S76, S78, S80, S82, or S83, the display controller 620 returns to S71, repeats the process, and displays state information corresponding to the result in the state information display unit.

Effect of Embodiment 4

The display controller 620 displays in the state information display unit state information corresponding to the voltage range corresponding to the detected temperature and the detected battery reserve. As a result, electronic timepiece state information corresponding to the remaining battery capacity and temperature can be displayed. For example, the user can be informed that charging is required when the reserve power is not sufficient to execute the reception process, and user convenience can be improved. When the user knows from the displayed content that charging is required and recharges the power supply, processes such as the reception process not executing because there is not enough battery power can be avoided, and more opportunities to execute the processes can be created.

When the detected battery voltage is greater than or equal to a threshold voltage set for the detected temperature, the display controller 620 displays information indicating that reception is allowed, and when the detected battery voltage is below the threshold voltage, displays information indicating that reception is not allowed. For example, because both the timekeeping and positioning reception processes can execute when the battery voltage is greater than or equal to the third threshold, markers L2 to L4 indicate reception-allowed state information. Because the positioning reception process is prohibited when the battery voltage is less than the third threshold, markers L0 and L1 indicate reception-prohibited state information. Thus comprised, the threshold voltages can be set according to the temperature with consideration for the voltage drop from the reception process increasing as the temperature decreases. As a result, that reception is prohibited can be displayed in advance when there is a chance of a system shutdown resulting from the reception process even if the temperature changed. As a result, the user can be informed when charging is required to run the reception process. Because the user can therefore recharge the battery before attempting the reception process, more chances to run the reception process can be created.

The user can also check if the reception process is allowed before starting the reception process. As a result, after confirming that the reception process is allowed, the user can go to a location where satellite signals can be received, the electronic timepiece can be made to run the reception process, and user convenience can be improved.

When the battery voltage is greater than or equal to the third threshold, which is the threshold voltage at which the positioning reception process is allowed, the display controller 620 indicates markers L2 to L4 as positioning-allowed state information. When the battery voltage is less than the third threshold and greater than or equal to the fourth threshold at which the timekeeping reception process is allowed, the display controller 620 indicates marker L1 as the timekeeping-allowed state information. When the battery voltage is less than the fourth threshold, the display controller 620 indicates marker L0 as the reception-prohibited state information.

As a result, the user can be informed of the type of reception process that is allowed at the detected battery voltage and temperature, or that the reception process is prohibited. The user can therefore determine if charging is required to run the positioning reception process, recharge the battery if charging is required, and user convenience can be improved.

By indicating that the positioning reception process is prohibited when the battery voltage is less than the third threshold, system shutdowns caused by running the positioning reception process can be prevented.

Furthermore, by setting a fourth threshold at which the timekeeping reception process is allowed, that the timekeeping reception process is allowed can be indicated even when the positioning reception process is not allowed. As a result, more chances to run the timekeeping reception process can be created than when only a threshold voltage at which the timekeeping reception process is allowed is set.

In addition to reception-allowed state information and reception-prohibited state information, the state information display unit in this embodiment displays information related to the remaining operating time of the electronic timepiece 1A based on the detected battery voltage and temperature. As a result, the user can be know the remaining operating time at the current temperature, and user convenience can be improved.

When the internal resistance of the storage battery 24 increases and the drop in power increases because the temperature dropped, the user can be informed that charging is required, and system shutdowns resulting from the temperature drop can be prevented.

Other Embodiments

The invention is not limited to the above embodiments, and can be modified in many ways without departing from the scope of the accompanying claims.

For example, the fourth embodiment displays state information by correlating information related to the type of reception process allowed and the remaining battery capacity to the markers L0 to L4 as state information, and setting the hand 4B to the marker L0 to L4 appropriate to the current state. The invention is not so limited, however, and may have a state information display unit that indicates the specific state as shown in FIG. 16.

Figure 16:
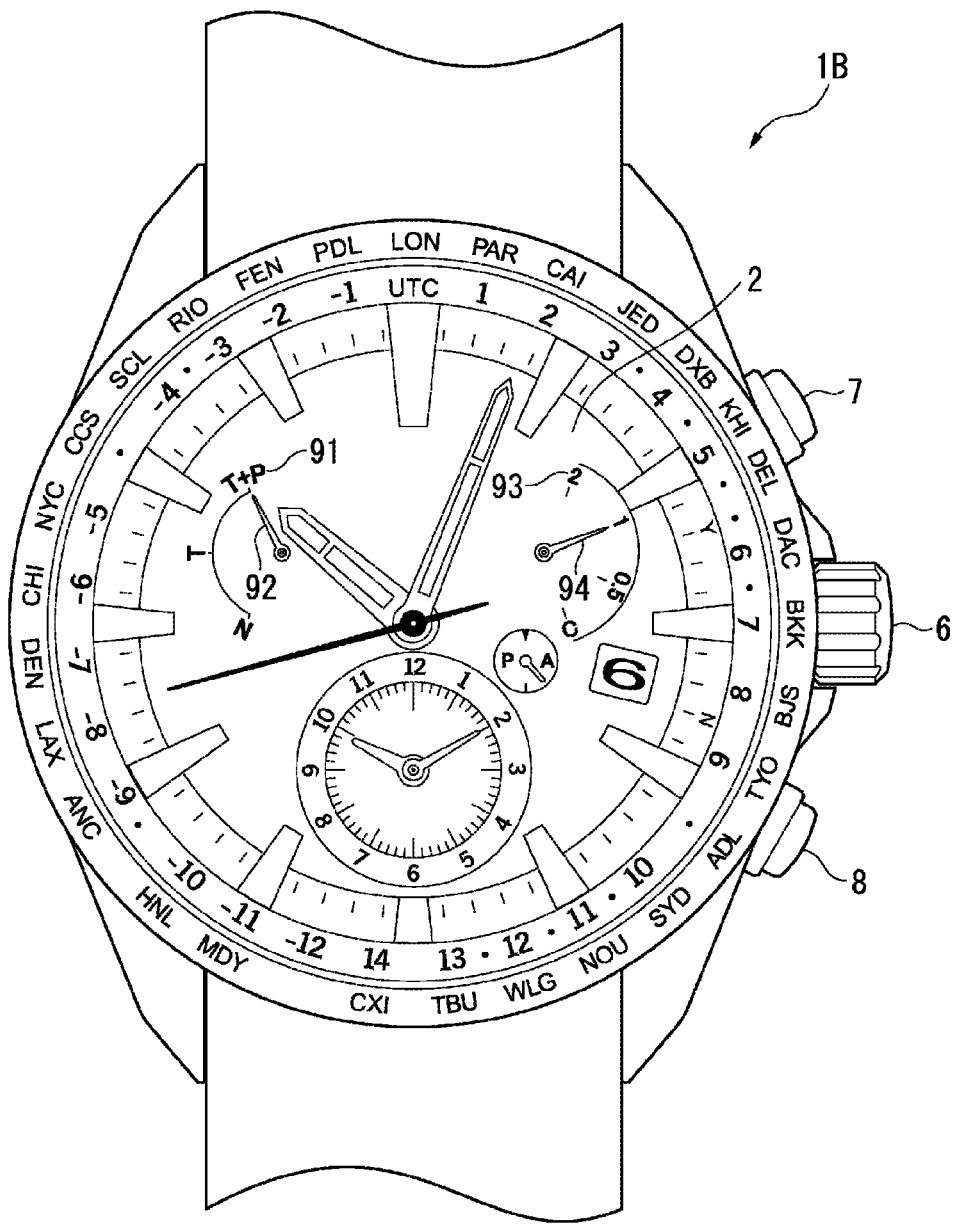
FIG. 16 is a plan view of an electronic timepiece according to another embodiment.

The electronic timepiece 1B shown in FIG. 16 has a first state information display unit including subdial 91 and hand 92, and a second state information display unit including subdial 93 and hand 94.

The first state information display unit indicates the type of reception process that is allowed to be executed as the state information. More specifically, the markers T+P, T, and N are presented on the subdial 91 to indicate the type of reception process. The T+P marker indicates that both timekeeping and positioning reception processes are allowed; T indicates that only the timekeeping reception process is allowed; and N indicates that the reception process is prohibited. The type of reception process that is allowed or not is indicated by setting the hand 92 to the appropriate marker T+P, T, or N.

The state information indicated by the second state information display unit is the remaining operating time and a charge warning. More specifically, markers 2, 1, 0.5, and C are presented on the subdial 93. The 2 marker indicates the remaining operating time is 2 years, 1 indicates the remaining operating time is 1 year, 0.5 indicates the remaining operating time is half a year, and C indicates that charging is required. For example, by setting the hand 94 to the C marker in the second state information display unit when the battery voltage is less than the third threshold, the user can be informed that the reception process (at least the positioning reception process) is not allowed.

The current state of the electronic timepiece 1A can thus be easily known by the state information display unit indicating the specific condition of the electronic timepiece 1A based on the temperature and battery voltage. For example, by reading the first state information display unit, the user can easily know the type of reception process that is allowed to be executed. Before starting the reception process, the user can know if the reception process is allowed, and user convenience is improved. By reading the second state information display unit, the user can also easily know the remaining operating time and if charging is required.

Configurations in which button 7 is pressed to start the reception process are described above, but the invention is not so limited. For example, the electronic timepiece may be configured with an operating member other than the crown 6 or a button 8 to start reception, or to start the reception process by working a combination of multiple operating members. Further alternatively, the electronic timepiece may have operating member to invoke the timekeeping reception process, and a separate operating member to invoke the positioning reception process.

In the first to third embodiments the second hand 31 is set to the N marker on the dial 2 as the reception-prohibited state information, and is set to the 1 marker to indicate that reception is in progress, but the invention is not so limited. More specifically, specific characters or marks meaning that reception is prohibited and reception is in progress may be separately provided on the dial 2. Further alternatively, a state information display unit having a subdial and hand for indicating that reception is prohibited and reception is in progress may also be separately provided on the dial 2.

The foregoing embodiments set threshold voltages for two or three temperature ranges and determine the type of reception process to allow, but the invention is not so limited.

For example, threshold voltages may be set for four or more temperature ranges, or threshold voltages may be set for specific temperatures. Thus comprised, whether or not to allow the reception process can be determined more appropriately to the temperature, and more chances to run the reception process can be created.

In the first to third embodiments the reception controller 660 references threshold data (threshold temperature information) previously stored in the storage 69, acquires the threshold voltage corresponding to the temperature, and determines whether or not to allow the reception process. In the fourth embodiment, the reception controller 660 references state evaluation data previously stored in the storage 69, acquires the state evaluation threshold corresponding to the temperature, and determines the current state. However, the invention is not so limited. For example, a configuration in which the threshold voltages or state evaluation thresholds are embedded in an evaluation program for performing this evaluation, the program is stored in the storage 69, and the control unit 61 runs the evaluation program is conceivable.

Yet further, a function for computing the threshold voltages or state evaluation thresholds using the temperature detected by the temperature detector 67 as a variable may be stored in the storage 69.

In the first to third embodiments the voltage detection controller 640 operates the voltage detection circuit 74 at a regular interval to detect the voltage, but the voltage detection controller 640 may operate the voltage detection circuit 74 to detect the voltage when the reception process starts. If configured to detect the voltage when the reception process starts, the battery voltage (remaining battery capacity) at the time the reception process starts can be determined more accurately. As a result, the reception controller 660 can determine whether or not to allow the reception process, or select the remaining operating time, more appropriately based on the storage battery 24 voltage detected immediately before.

In the embodiments and variations thereof described above the electronic timepiece has a time display unit comprising a dial 2 and hands 3, but the invention is not so limited. The electronic timepiece may have a time display unit embodied by an LCD panel, for example. In this event, the driver that drives the time display unit is embodied by a driver that drives a liquid crystal display panel.

The electronic timepiece has a time display function, but the time display unit does not need to be a dedicated display unit for displaying time. Examples of such electronic timepieces include heart rate monitors worn on the user's wrist, GPS loggers that are worn on the user's wrist and monitor and log the current location while the user is jogging, and other types of wearable devices.

A GPS satellite is used as an example of a positioning information satellite above, but the invention is not so limited. For example, the positioning information satellite may be a satellite used in a Global Navigation Satellite System (GNSS) such as Galileo (EU) or GLONASS (Russia). Geostationary satellites in a geostationary satellite-based augmentation system (SBAS), and quasi-zenith satellites (such as Michibiki) used in a regional navigation satellite system (RNSS) that can only be accessed in specific regions, can also be used.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2015-157420, filed Aug. 7, 2015 is expressly incorporated by reference herein.

What is claimed is:

1. An electronic timepiece comprising:
    a receiver configured to receive a satellite signal;
    a power supply that supplies drive power;
    a remaining battery capacity detector configured to detect the reserve power of the power supply;
    a temperature detector that detects temperature; and
    a reception controller configured to execute a reception process that receives a satellite signal using the receiver;
    wherein the reception controller executes the reception process when the reserve power detected by the remaining battery capacity detector is greater than or equal to a threshold set for the temperature detected by the temperature detector, and
        does not execute the reception process when the reserve power is less than the threshold.

2. The electronic timepiece described in claim 1, wherein:
    the reception controller executes a timekeeping reception process to acquire time information based on the satellite signal, or a positioning reception process to calculate positioning information based on the satellite signals, based on a command;
        executes the positioning reception process if the reserve power detected by the remaining battery capacity detector is greater than or equal to a first threshold set for the positioning reception process based on the temperature detected by the temperature detector, and does not execute the positioning reception process if less than the first threshold, when the positioning reception process is commanded; and executes the timekeeping reception process if the reserve power is greater than or equal to a second threshold set for the timekeeping reception process based on the temperature, and does not execute the timekeeping reception process if less than the second threshold, when the timekeeping reception process is commanded; and the first threshold is higher than the second threshold.

3. The electronic timepiece described in claim 1, further comprising:
a reception state display unit configured to indicate reception is in progress while the reception process is running, and
indicate reception is prohibited when the reception process is not allowed.

4. The electronic timepiece described in claim 1, further comprising:
a storage storing temperature-threshold information relating temperatures and thresholds;
the reception controller acquiring a threshold corresponding to the temperature based on the temperature detected by the temperature detector and the threshold temperature information, comparing the reserve power and the threshold, and controlling reception.

5. An electronic timepiece comprising:
a receiver configured to receive a satellite signal;
a power supply that supplies drive power;
a remaining battery capacity detector configured to detect the reserve power of the power supply;
a temperature detector that detects temperature;
a state information display unit configured to indicate state information corresponding to the reserve power and the temperature;
a reception controller configured to execute a reception process that receives a satellite signal; and
a display controller configured to cause the state information display unit to display state information corresponding to the reserve power detected by the remaining battery capacity detector and the temperature detected by the temperature detector.

6. The electronic timepiece described in claim 5, wherein:
the state information includes reception-allowed state information indicating executing the reception process is allowed, and reception-prohibited state information indicating the reception process is not allowed;
the display controller causing the state information display unit to indicate the reception-allowed state information when the reserve power detected by the remaining battery capacity detector is greater than or equal to a threshold set for the temperature detected by the temperature detector, and
causing the state information display unit to indicate the reception-prohibited state information when the reserve power is less than the threshold.

7. The electronic timepiece described in claim 6, wherein:
the reception controller executes a timekeeping reception process to acquire time information based on the satellite signal, and a positioning reception process to calculate positioning information based on the satellite signals;
the reception-allowed state information includes positioning-allowed state information indicating the positioning reception process is allowed, and timekeeping-allowed state information indicating the timekeeping reception process is allowed;
the display controller displays the positioning-allowed state information when the reserve power detected by the remaining battery capacity detector is greater than or equal to a first threshold set for the positioning reception process based on the temperature detected by the temperature detector,
displays the timekeeping-allowed state information when the reserve power is less than the first threshold and is greater than or equal to the second threshold set for the timekeeping reception process based on the temperature, and
displays the reception-prohibited state information when the reserve power is below the second threshold.

8. A control method of an electronic timepiece having a receiver configured to receive satellite signals,
a power supply that supplies drive power,
a remaining battery capacity detector configured to detect the reserve power of the power supply,
a temperature detector that detects temperature, and
a reception controller configured to execute a reception process that receives a satellite signal using the receiver,
the control method comprising:
a step of the temperature detector detecting the temperature;
a step of the remaining battery capacity detecting the reserve power; and
a step of the reception controller executing the reception process when the reserve power detected by the remaining battery capacity detector is greater than or equal to a threshold set for the temperature detected by the temperature detector, and not executing the reception process when the reserve power is less than the threshold.

* * * * *